(12) United States Patent
Fujisawa et al.

(10) Patent No.: US 7,410,680 B2
(45) Date of Patent: Aug. 12, 2008

(54) RETARDATION FILM MADE BY USING CELLULOSE DERIVATIVES

(75) Inventors: Hideyoshi Fujisawa, Saitama (JP); Kouichi Tanaka, Kita-ku (JP)

(73) Assignees: Nippon Kayaku Kabushiki Kaisha, Tokyo (JP); Polatechno Co., Ltd., Niigata (JP)

(*) Notice: Subject to any disclaimer, the term of this patent is extended or adjusted under 35 U.S.C. 154(b) by 187 days.

(21) Appl. No.: 10/569,928

(22) PCT Filed: Aug. 26, 2004

(86) PCT No.: PCT/JP2004/012300

§ 371 (c)(1),
(2), (4) Date: Feb. 27, 2006

(87) PCT Pub. No.: WO2005/022215

PCT Pub. Date: Mar. 10, 2005

(65) Prior Publication Data
US 2007/0036916 A1  Feb. 15, 2007

(30) Foreign Application Priority Data
Aug. 28, 2003 (JP) ............... 2003-305182
Nov. 26, 2003 (JP) ............... 2003-395445
Dec. 26, 2003 (JP) ............... 2003-431930

(51) Int. Cl.
*G02F 1/13363* (2006.01)

(52) U.S. Cl. .............. 428/1.33; 428/1.54; 349/96; 349/117; 536/63; 536/76

(58) Field of Classification Search ............ 428/1.33, 428/1.54; 349/96, 117–118; 536/63–64, 536/69–70, 58
See application file for complete search history.

(56) References Cited

U.S. PATENT DOCUMENTS 524,456 A   8/1894   Benson .............. 402/25

(Continued)

FOREIGN PATENT DOCUMENTS

JP   2818983   8/1998

(Continued)

OTHER PUBLICATIONS

Cellulosic Polymers Blends and Composites; Richard D. Gilbert; Hanser Gardner Publications, pp. 25-94, 1994.

(Continued)

*Primary Examiner*—Keith D. Hendricks
*Assistant Examiner*—Sophie Hon
(74) *Attorney, Agent, or Firm*—Nields & Lemack

(57) ABSTRACT

The present invention relates to a retardation film obtained by subjecting a film formed from a cellulose derivative to an orientation treatment, wherein a hydroxyl group of cellulose is substituted by at least one kind of aliphatic acyl group having 5 to 20 carbon atoms, and a degree of substitution by said hydroxyl group is 1 to 3. According to the present invention, a retardation film having various wavelength dispersion characteristics, positiveness or negativeness in birefringence and viewing angle characteristics, in particular, an achromatic retardation film and a retardation film having a high birefringent property and the like can be obtained by preparing a retardation film using a properly selected said cellulose derivative as a raw material of the film.

13 Claims, 14 Drawing Sheets

U.S. PATENT DOCUMENTS

| | | | | |
|---|---|---|---|---|
| 5,750,677 A | * | 5/1998 | Edgar et al. | 536/63 |
| 6,599,443 B1 | | 7/2003 | Sharples et al. | 252/299.63 |
| 7,163,723 B2 | | 1/2007 | Tanaka et al. | 428/1.1 |
| 2003/0156235 A1 | * | 8/2003 | Kuzuhara et al. | 349/96 |
| 2004/0096594 A1 | | 5/2004 | Takeuchi | 428/1.2 |

FOREIGN PATENT DOCUMENTS

| | | |
|---|---|---|
| JP | 2000-98133 | 4/2000 |
| JP | 2000-137116 | 5/2000 |
| JP | 3174367 | 3/2001 |
| JP | 2001-91743 | 4/2001 |
| JP | 2003-58320 | 2/2003 |
| JP | 2003-240955 | 8/2003 |
| JP | 2004-148811 | 5/2004 |
| WO | 92/93213 | 5/2002 |

OTHER PUBLICATIONS

The International Search Report dated Dec. 14, 2004.

* cited by examiner

RETARDATION FILM MADE BY USING CELLULOSE DERIVATIVES

This application is a 371 of PCT/JP2004/012300 filed Aug. 26, 2004.

TECHNICAL FIELD

The present invention relates to a retardation film using a cellulose derivative useful for image display devices such as liquid crystal display devices.

BACKGROUND ART

Retardation films have functions to convert linearly polarized light into circularly polarized light or elliptically polarized light and to change the polarization axis of linearly polarized light in a certain direction to another direction (optical rotation). By using these functions, it is possible to improve, for example, visible angle and contrast of liquid crystal display devices. The retardation film can be obtained by uniaxially or biaxially stretching plastic films such as polycarbonate, polyarylate and polyether sulfone. In this instance, birefringence is generated due to an anisotropy in refractive index generated by stretching, and hence the film works as a retardation film. Optical performance of a retardation film can be determined by retardation value which is calculated from a difference between a refractive index in the slow axis direction (a direction in which refractive index in the plane becomes the largest) and a refractive index in the fast axis direction (a direction orthogonal to the slow axis direction in the plane) along the front direction of the retardation film at a certain wavelength multiplied by a thickness of the retardation film. However, the retardation value exhibits so-called wavelength dependency (wavelength dispersion characteristics) and visible angle dependency (visible angle characteristics), and the retardation film is used for various types of display devices considering comprehensive performances including these various characteristics.

The wavelength distribution characteristics differ depending on a type of material to be used, and the retardation film made of general polymer materials have the characteristics that the retardation value in the wavelength side longer than 550 nm is smaller than the retardation value at a wavelength of 550 nm and the retardation value in the wavelength side shorter than 550 nm is larger than the retardation value at a wavelength of 550 nm.

Accordingly, even if a retardation value at a wavelength of 550 nm is adjusted for 137.5 nm to produce a quarter retardation film, the retardation in the wavelength side longer than 550 nm becomes ¼ or less of the wavelength, and the retardation in the wavelength side shorter than 550 nm becomes ¼ or more of the wavelength.

This poses, for example, the problem that when a retardation film (so-called quarter wavelength plate) having a retardation which is ¼ of the wavelength is used to produce an anti-reflection filter, a sufficient anti-reflection effect is obtained only in the wavelength range where the retardation is almost ¼ of the wavelength and circularly polarized light is converted into elliptically polarized light at other wavelengths resulting in that only insufficient anti-reflection effect is obtained. Also, when a retardation film (so-called half wavelength plate) having a retardation which is ½ of the wavelength is used to produce a rotary polarizer which is used for a liquid crystal projector and the like, only in the wavelength range where the retardation is almost ½ of the wavelength can rotate a linearly polarized light as linearly polarized light, and linearly polarized light is converted into elliptically polarized light at other wavelength with the result that only an insufficient rotary polarizing effect is obtained.

A retardation film having such wavelength distribution characteristics that impart the same level of retardation to a wavelength through the whole range of visible region is called as an achromatic retardation film, and it is necessary to exhibit such tendency (achromatic property) that, for example, the retardation value in the wavelength side longer than 550 nm is larger than the retardation value at a wavelength of 550 nm and the retardation value in the wavelength side shorter than 550 nm is smaller than the retardation value at a wavelength of 550 nm. As a method to produce such a retardation film, for example, a method has been proposed in which a plurality of stretched films are laminated with their optical axes being crossed over with each other, as described in Patent Reference 1. Further, a retardation film has been proposed, which is produced by using cellulose acetate obtained by hydrolyzing cellulose triacetate and can impart the same level of retardation to each wavelength in a wide range of the visible region by using only one film, as described in Patent Reference 2.

Also, a technique to produce a retardation film by using liquid crystal compounds which can be oriented on a substrate which has been subjected to rubbing treatment and a composition containing a plurality of such compounds, and orientating said compounds in a specific direction has been known, as described in Patent Reference 3. Further, a retardation film obtained by orientating a liquid crystal compound in a specified direction has wavelength distribution characteristics that can impart the similar level of retardation to each wavelength in a wide range of the visible region by using only one film, as described in Patent Reference 4.

On the other hand, visible angle characteristics can be generally controlled by a stretching method of the retardation film. In the case of usual retardation film obtained by uniaxially stretching a polymer film such as polycarbonate, when the film is tilted in the slow axis direction (a direction in which refractive index becomes the largest in the film plate), retardation value becomes smaller as the tilt angle from the front direction becomes larger, and contrary, when the film is tilted in the fast axis direction (a direction orthogonal to the slow axis in the film plane), retardation value becomes larger as the tilt angle from the front direction becomes larger. This tendency is one commonly observed with other usual uniaxially stretched retardation films of polyarylate, polyether sulfone and cycloolefin polymer such as Zeonor (trade name, made by Zeon Corp.) and Arton (trade name, made by JSR). If retardation value changes when the film is tilted as described above, visible angle characteristics become worse. Therefore, it is demanded that retardation value does not change by tilting in an application where visible angle characteristics become a subject of discussion. When retardation value does not change at all by tilting, retardation value shows little change even if the film is tilted in any direction of the slow axis direction and the fast axis direction, and such retardation film is demanded.

To solve this problem, a retardation film has been disclosed in Patent Reference 5, in which change of the retardation value by tilting is controlled by laminating a film to be stretched and a shrinkable film, and practically biaxially stretching by uniaxially stretching the laminated film.

Patent Reference 1: JP 3174367
Patent Reference 2: JP-A-2000-137116
Patent Reference 3: JP-A-2000-98133
Patent Reference 4: WO 02/093213A1
Patent Reference 5: JP 2818983

DISCLOSURE OF THE INVENTION

Problems to be Solved by the Invention

Desired wavelength dispersion characteristics and birefringence differ depending on an intended application. However, to obtain the desired wavelength distribution characteristics, conventionally a retardation film had to be used, which consisted of polymers being totally different in their main chain parts, basic structures of the polymers, from each other. That means, a polymer had to be synthesized from the main chain part thereof for each material having different wavelength dispersion. This had posed a problem that the wavelength distribution could not be optionally selected because synthesis and molecular weight control of the polymer were very difficult for some polymer structures. Further, birefringence characteristics includes a positive birefringent property and a negative birefringent property, and though an absolute value of birefringence was able to be controlled by adjusting processing conditions, control of positive or negative could not be achieved unless basic structure of the polymer was changed. Further, there was a problem that a retardation film using a so-called cellulose acetate as described in Patent Reference 2 was not only poor in birefringence characteristics but required addition of a plasticizer in an amount of about 10 to 15% to improve stretchability, which caused a further decrease of birefringence characteristics. Accordingly, when a retardation value necessary for a quarter wavelength retardation film was required, thickness had to be increased, resulting in fail to sufficiently correspond to the request of thinning. Still further, change of retardation value when a retardation film is tilted from the front direction, so-called visible angle characteristics of a retardation film, was not necessarily superior.

On the other hand, control of visible angle characteristics has been conventionally achieved only by a stretching method. However, in the method in which biaxial stretching was practically performed by laminating a shrinkable film as described in Patent Reference 5, there were additional processes such as lamination of a shrinkable film and delamination after stretching, causing a problem of cost up with these additional processes.

Means to Solve the Problems

The inventors of the present invention have made earnest studies to solve the above problems, and found that a cellulose derivative in which hydroxyl group is substituted by an aliphatic acyl group having 5 to 20 carbon atoms with a degree of substitution of the hydroxyl group being 1.00 to 2.99 per one cellulose monomer unit can solve these problems by properly selecting substituent and degree of substitution without changing basic skeletal structure thereof. Namely, the inventors have found that wavelength distribution characteristics and positive or negative birefringent property can be optionally controlled by changing structure or degree of substitution of said cellulose, that thickness of the film can be reduced because a film having a high birefringence characteristics can be obtained by selecting said cellulose derivative, and further that a retardation film can be obtained which has a biaxial characteristics only by uniaxially stretching without practically performing biaxial stretching as described in Patent Reference 5 as well as controlled viewing angle characteristics, to complete the present invention.

Thus, the present invention relates to:

(1) A retardation film formed from a cellulose derivative, wherein a hydroxyl group of cellulose is substituted by an aliphatic acyl group having 5 to 20 carbon atoms in a degree of substitution of 1 to 3 substitutions per one cellulose monomer unit and by a substituent other than said aliphatic acyl group in a degree of substitution of 0 to 2 substitutions per one cellulose monomer unit;

(2) The retardation film according to the above (1), wherein a degree of substitution of a hydroxyl group by an aliphatic acyl group having 5 to 20 carbon atoms is 1.00 to 2.99 substitutions per one cellulose monomer unit;

(3) The retardation film according to the above (1), wherein the substituent other than the aliphatic acyl group having 5 to 20 carbon atoms is any group of an aliphatic acyl group having a different structure from said aliphatic acyl group, an aromatic acyl group, an alkyl carbamoyl group, an aromatic carbamoyl group, an acyl group having a tolan skeletal structure, an acyl group having a biphenyl skeletal structure or a polymerizable group, and a total degree of substitution of a hydroxyl group by said aliphatic acyl group and a substituent other than said aliphatic acyl group is 1.50 to 2.99 substitutions per one cellulose monomer unit;

(4) The retardation film according to the above (1), wherein the aliphatic acyl group having 5 to 20 carbon atoms is a linear aliphatic acyl group in a degree of substitution of 1.5 to 3, and the substituent other than said aliphatic acyl group is an acyl group having 1 to 4 carbon atoms in a degree of substitution of 0 to 1.5;

(5) The retardation film according to the above (4), wherein the acyl group having 1 to 4 carbon atoms is an acetyl group;

(6) The retardation film according to the above (1) or (2), wherein said retardation film satisfies the relations represented by the following formulae (1) and (2):

$$(Re750/Re550) = A1/\Delta n + 1 \tag{1}$$

$$(Re450/Re550) = A2/\Delta n + 1 \tag{2}$$

[wherein, (Re750/Re550) is a ratio of a retardation value at a wavelength of 750 nm to a retardation value at a wavelength of 550 nm showing a value of 0.05 to 1.95; (Re450/Re550) is a ratio of a retardation value at a wavelength of 450 nm to a retardation value at a wavelength of 550 nm showing a value of 0.05 to 1.95; $\Delta n$ is a birefringence of the retardation film at a wavelength of 550 nm showing a value of 0.0001 to 0.06; A1 and A2 are each a constant showing a value of −0.06 to 0.06, and when A1 is a positive value A2 becomes a negative value, and when A1 is a negative value A2 becomes a positive value];

(7) A composite retardation film prepared by laminating the retardation film according to any one of the above (1) to (6) and another retardation film;

(8) A circularly or an elliptically polarizing film or a rotary polarizing film prepared by laminating the retardation film or the composite retardation film according to any one of the above (1) to (7) and a polarizing film;

(9) An optical film prepared by laminating the retardation film according to any one of the above (1) to (6) and a polarizing film so that the slow axis of said retardation film and the absorption axis or the penetration axis of said polarizing film are in parallel or in orthogonal to each other;

(10) A composite optical film prepared by laminating a film having Rth calculated by Rth=(no−ne)×d [wherein, ne is an average refractive index in the film plane; no is a refractive index in the thickness direction; (ne−no)<0; d is a thickness] of 100 to 300 nm and a retardation value in the front direction of the film at 550 nm is 0 to 50 nm, the retardation film according to any one of the above (6) or (7) and a polarizing film so that the slow axis of said retardation film and the absorption axis or the penetration axis of said polarizing film are in parallel or in orthogonal to each other;

(11) The circularly or the elliptically polarizing film, the rotary polarizing film or the optical film according to any one of the above (8) to (10), wherein a polarizing element constructing a polarizing film and the retardation film according to any one of the above (6) or (7) are directly laminated;

(12) An image display device equipped with the retardation film according to any one of the above (6) or (7), or the circularly or the elliptically polarizing film, the rotary polarizing film, the optical film or the composite optical film according to any one of the above (6) to (11);

(13) The image display device according to the above (12), wherein the image display device is a liquid crystal display device;

(14) Cellulose n-pentanate wherein a degree of substitution by a n-pentanoyl group is 2.0 to 2.98;

(15) Cellulose n-hexanate wherein a degree of substitution by a n-hexanoyl group is 2.0 to 2.9;

(16) Cellulose n-heptanate wherein a degree of substitution by a n-heptanoyl group is 1.5 to 2.9;

(17) Cellulose n-heptanate acetate wherein a degree of substitution by a n-heptanoyl group is 1.5 to 2.8 and a degree of substitution by an acetyl group is 0.02 to 1.0; and

(18) Cellulose n-octanate wherein a degree of substitution by a n-octanoyl group is 1.0 to 2.9.

EFFECT OF THE INVENTION

Wavelength distribution, positive or negative birefringent property and viewing angle characteristics of a retardation film can be controlled by preparing a retardation film using a cellulose derivative and a resin composition containing the same. In addition, thickness of the retardation film can be reduced because sufficient birefringence characteristics can be obtained depending on the cellulose derivative to be used. Further, the retardation film of the present invention can be used for a quarter wavelength retardation film constructing a reflection type and a semi-transmission type liquid crystal display device, an anti-reflection film such as an anti-reflection film of mirror surface for a touch panel, a visual compensation film such as a compensation film used for a VA mode liquid crystal display device, a film to improve a light utilization efficiency such as a wavelength plate for a polarized beam splitter of liquid crystal projector, and a retardation simultaneous compensation film of one or more wavelength such as a wavelength plate used for a pick-up for optical disc-writing. The retardation film of the present invention can be used, in combination with a polarizing film, for an organic electroluminescence type display device, a liquid crystal projector and a liquid crystal display device as a circularly polarizing film, a rotary polarizing film, an elliptically polarizing film, an optical film and a composite optical film, and the thus obtained image display device of the present invention can exhibit superior characteristics such as improved contrast and visible angle characteristics compared with the conventional image display device.

BRIEF DESCRIPTION OF THE DRAWINGS

FIG. 1 shows a graph illustrating a relationship between birefringence and ratio of retardation values Re750/Re550 in the retardation film prepared from the cellulose derivative of the present invention.

FIG. 2 shows a graph illustrating a relationship between birefringence and ratio of retardation values Re450/Re550 in the retardation film prepared from the cellulose derivative of the present invention.

FIG. 3 shows wavelength dispersions of the retardation films prepared from cellulose n-pentanate.

FIG. 4 shows wavelength dispersions of the retardation films prepared from cellulose n-hexanate.

FIG. 5 shows wavelength dispersions of the retardation films prepared from cellulose n-heptanate-acetate and cellulose n-octanate.

FIG. 6 shows a graph illustrating a relationship between birefringence and ratio of retardation values Re750/Re550 in the retardation film prepared from cellulose n-pentanate.

FIG. 7 shows a graph illustrating a relationship between birefringence and ratio of retardation values Re450/Re550 in the retardation film prepared from cellulose n-pentanate.

FIG. 8 shows a graph illustrating a relationship between birefringence and ratio of retardation values Re750/Re550 in the retardation film prepared from cellulose n-hexanate.

FIG. 9 shows a graph illustrating a relationship between birefringence and ratio of retardation values Re450/Re550 in the retardation film prepared from cellulose n-hexanate.

FIG. 10 shows a graph illustrating a relationship between birefringence and ratio of retardation values Re750/Re550 in the retardation film prepared from cellulose n-heptanate-acetate.

FIG. 11 shows a graph illustrating a relationship between birefringence and ratio of retardation values Re450/Re550 in the retardation film prepared from cellulose n-heptanate-acetate.

FIG. 12 shows viewing angle characteristics of the retardation films used in Example 12, Example 13 and Comparative Example 2.

FIG. 13 shows viewing angle characteristics of the retardation films used in Examples 24 to 28.

FIG. 14 shows wavelength dispersions of the retardation film used in Comparative Example 2.

EXPLANATION OF SYMBOLS

Figure 3:
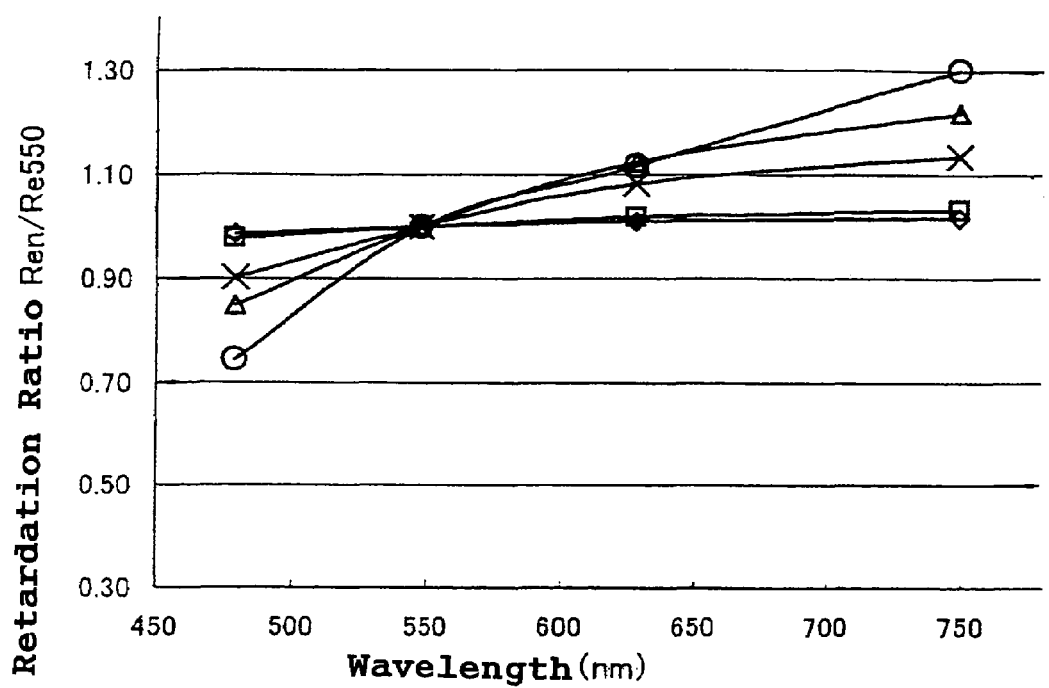
[FIG. 3]

FIG. 3
◇ shows Compound 1-1;
☐ shows Compound 1-2;
× shows Compound 1-3;
Δ shows Compound 1-4;
○ shows Compound 1-5.

Figure 4:
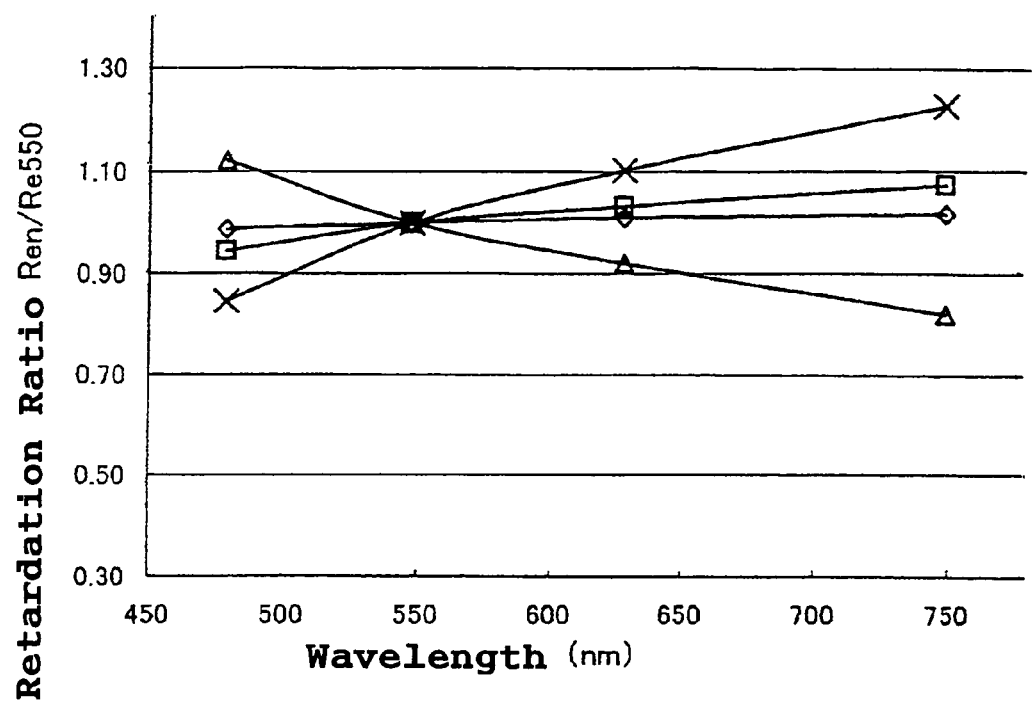
[FIG. 4]

FIG. 4
◇ shows Compound 2-1;
☐ shows Compound 2-2;
× shows Compound 2-3;
Δ shows Compound 2-4.

Figure 5:
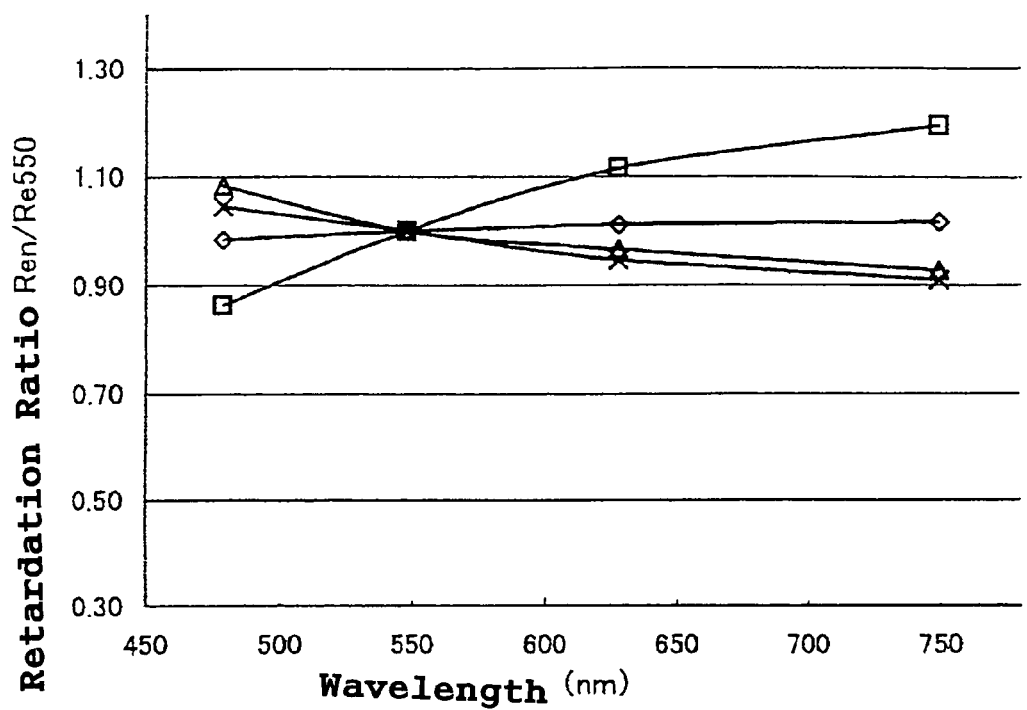
[FIG. 5]

FIG. 5
◇ shows Compound 3-1;
☐ shows Compound 3-2;
× shows Compound 3-3;
Δ shows Compound 4-1.

Figure 6:
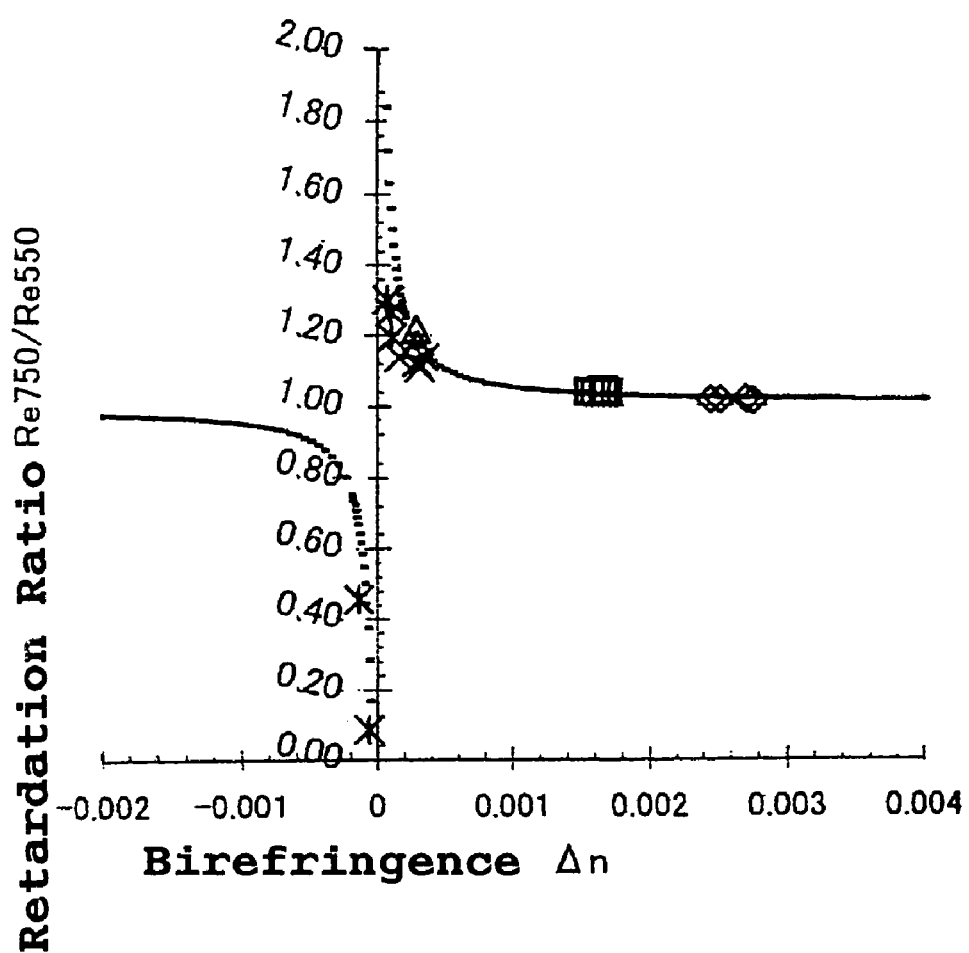
[FIG. 6]
Figure 7:
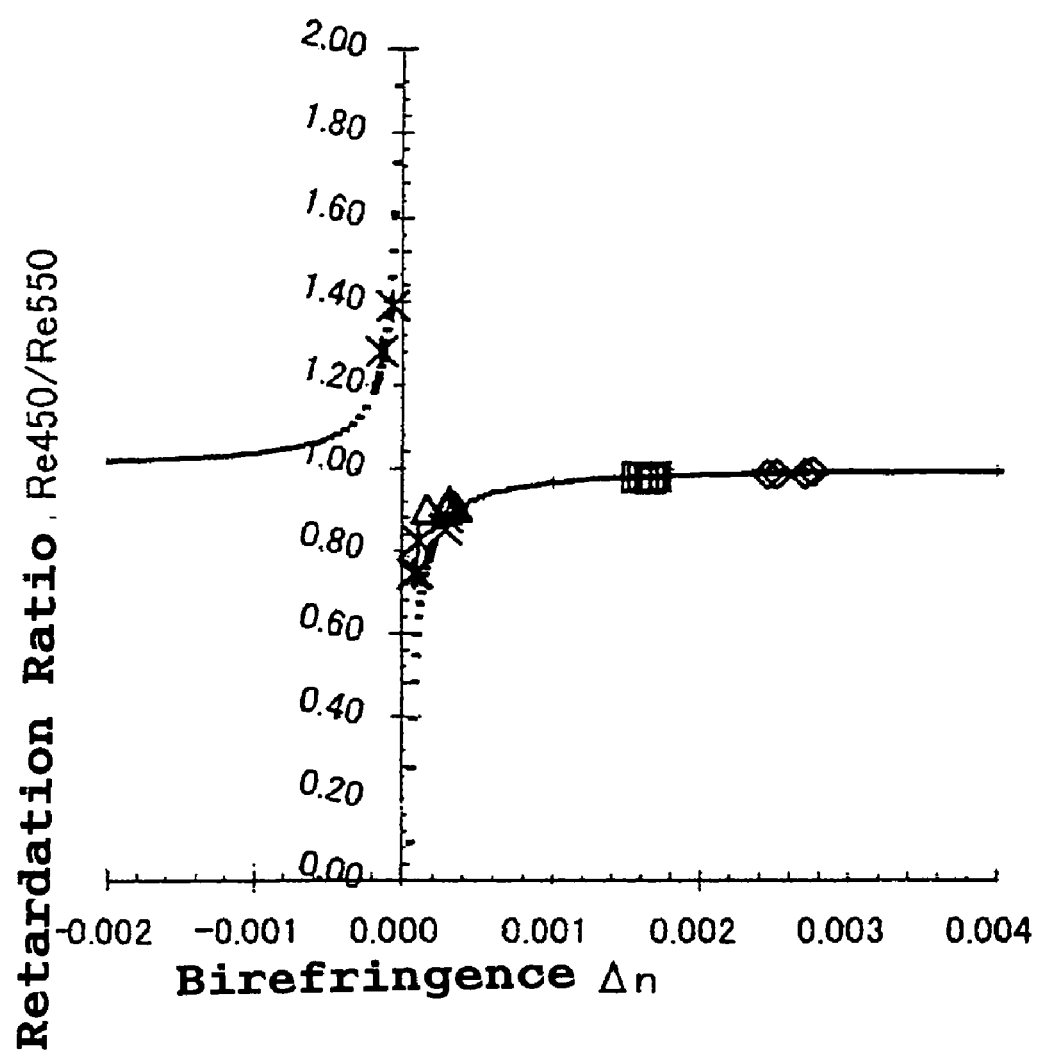
[FIG. 7]

FIG. 6 and FIG. 7
◊ shows Compound 1-1;
☐ shows Compound 1-2;
Δ shows Compound 1-3;
× shows Compound 1-4;
* shows Compound 1-5.

Figure 8:
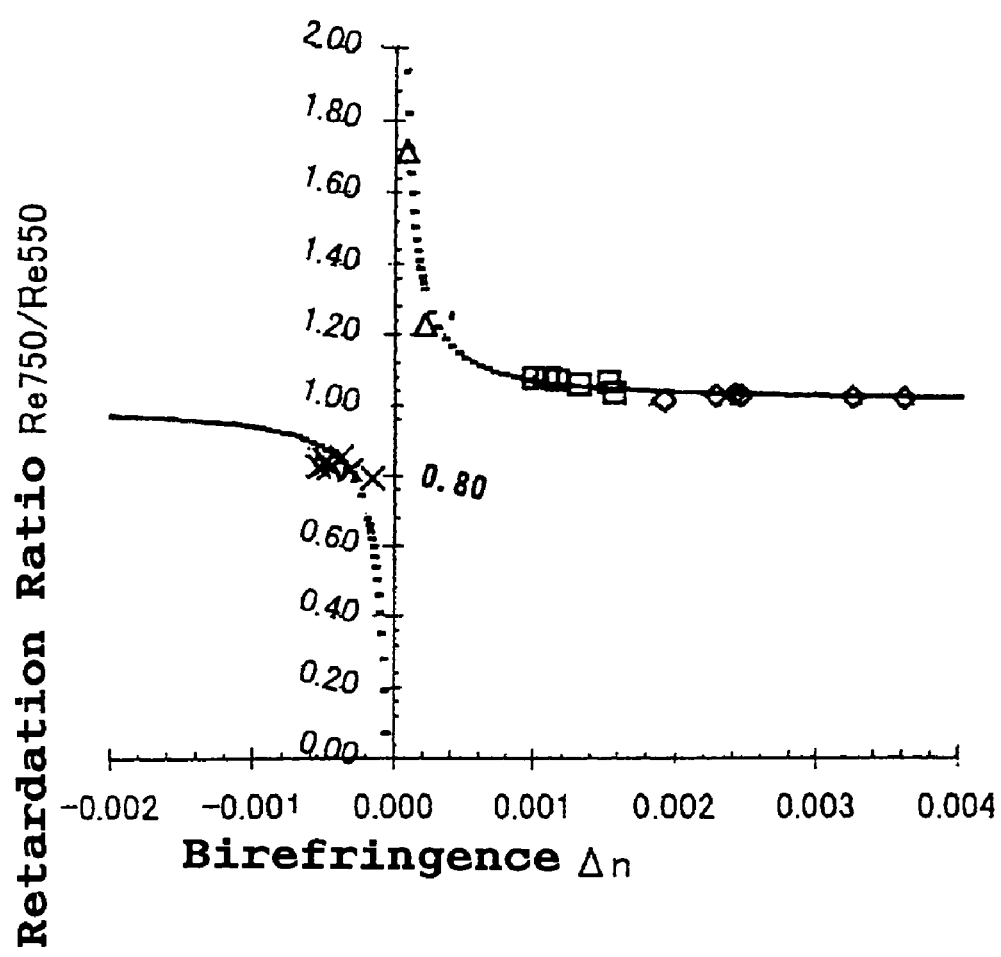
[FIG. 8]
Figure 9:
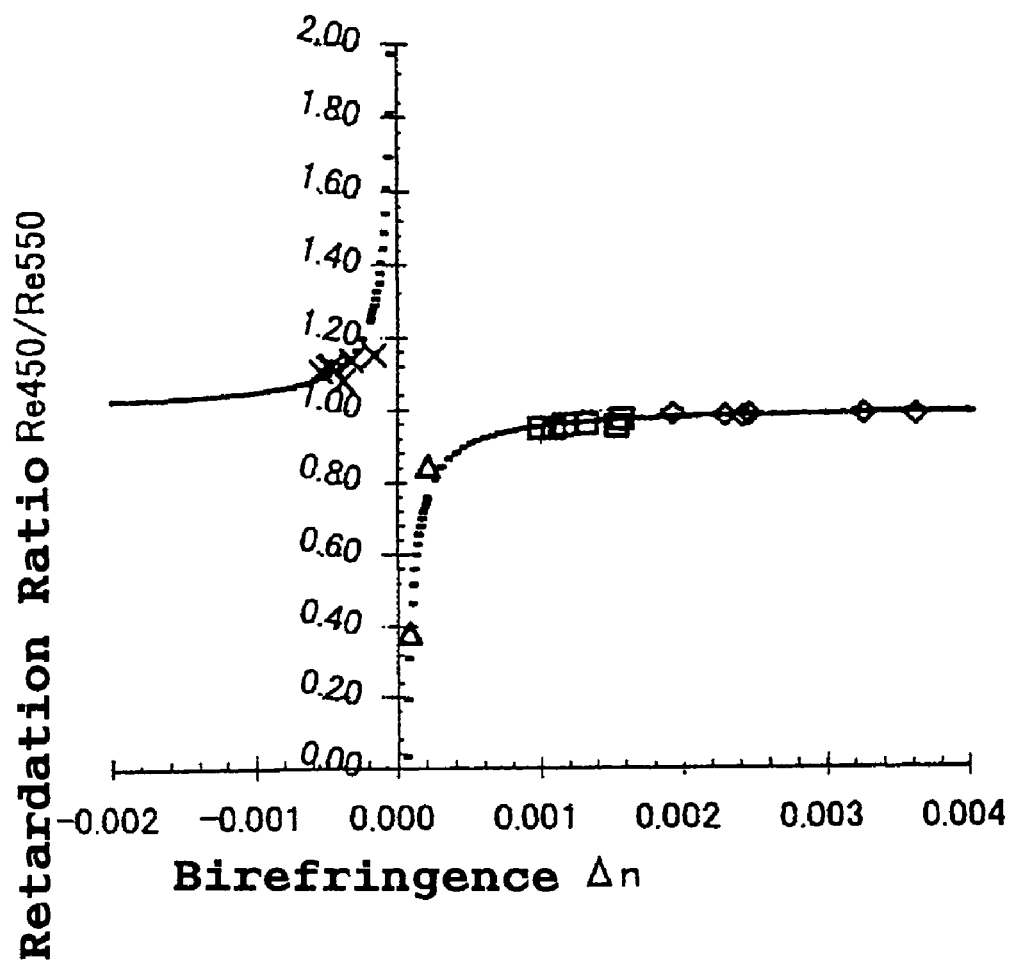
[FIG. 9]
Figure 10:
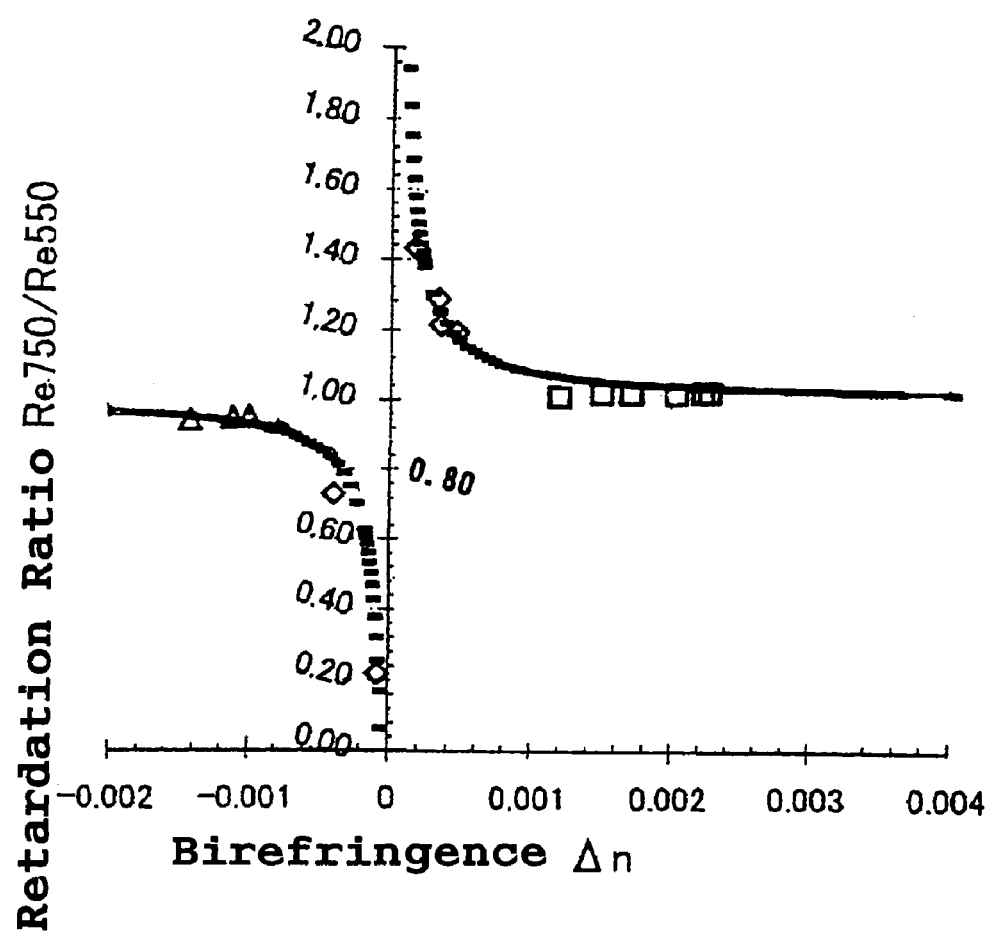
[FIG. 10]
Figure 11:
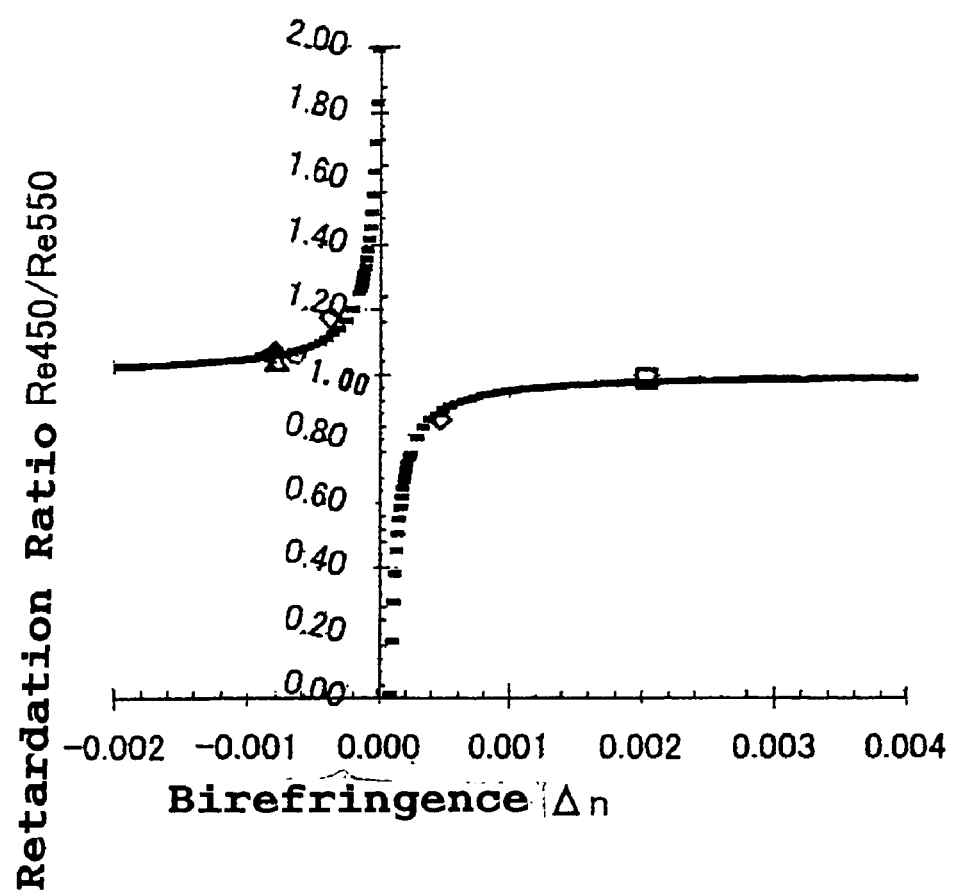
[FIG. 11]

FIG. 8 and FIG. 9
◊ shows Compound 2-1;
☐ shows Compound 2-2;
Δ shows Compound 2-3;
× shows Compound 2-4;

FIG. 10 and FIG. 11
◊ shows Compound 3-1;
☐ shows Compound 3-2;
Δ shows Compound 3-3.

Figure 12:
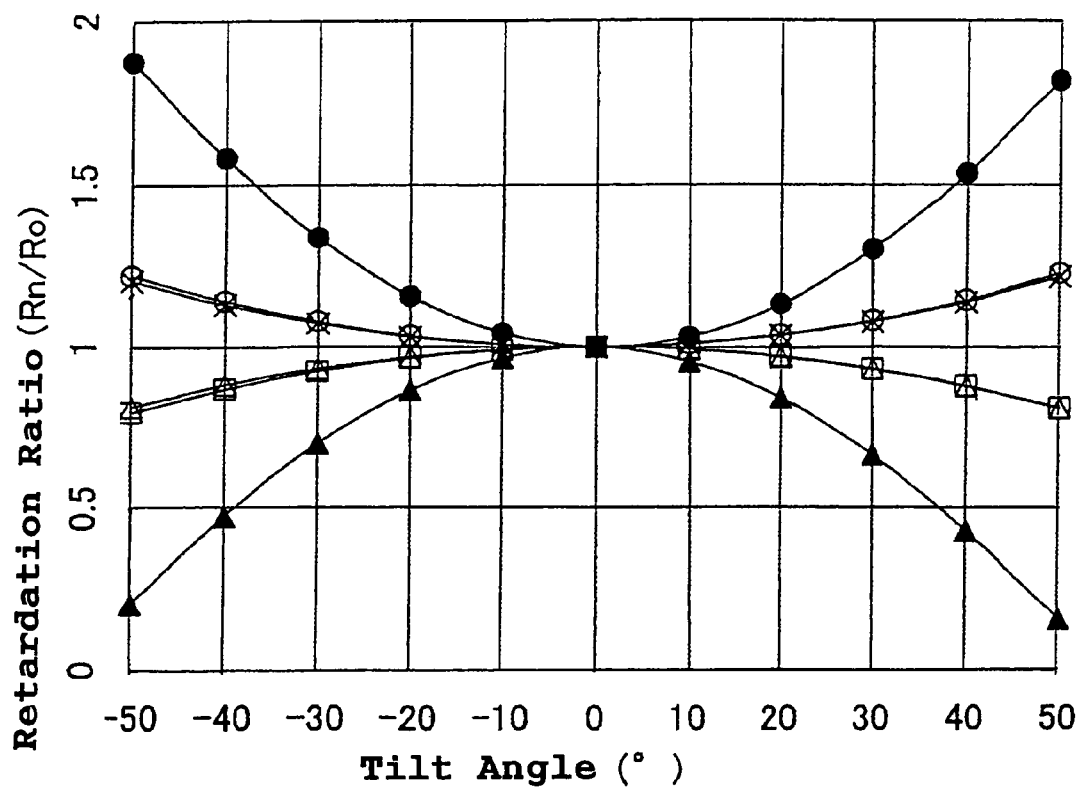
[FIG. 12]

FIG. 12
○ shows the case when the retardation film in Example 12 is tilted toward the fast axis direction;
☐ shows the case when the retardation film in Example 12 is tilted toward the slow axis direction;
× shows the case when the retardation film in Example 13 is tilted toward the fast axis direction;
Δ shows the case when the retardation film in Example 13 is tilted toward the slow axis direction;
● shows the case when the retardation film in Comparative Example 2 is tilted toward the fast axis direction;
▲ shows the case when the retardation film in Comparative Example 2 is tilted toward the slow axis direction.

Figure 13:
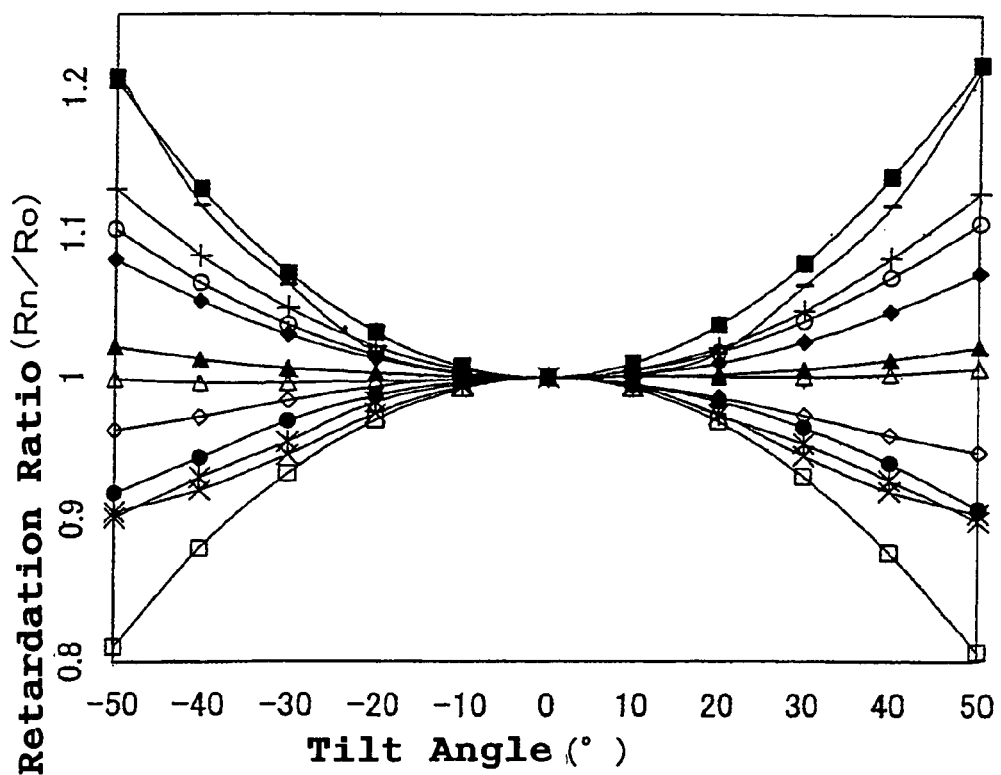
[FIG. 13]

FIG. 13
■ shows the case when the retardation film in Example 13 is tilted toward the fast axis direction;
☐ shows the case when the retardation film in Example 13 is tilted toward the slow axis direction;
× shows the case when the retardation film in Example 24 is tilted toward the fast axis direction;
– shows the case when the retardation film in Example 24 is tilted toward the slow axis direction;
● shows the case when the retardation film in Example 25 is tilted toward the fast axis direction;
○ shows the case when the retardation film in Example 25 is tilted toward the slow axis direction;
♦ shows the case when the retardation film in Example 26 is tilted toward the fast axis direction;
◊ shows the case when the retardation film in Example 26 is tilted toward the slow axis direction;
▲ shows the case when the retardation film in Example 27 is tilted toward the fast axis direction;
Δ shows the case when the retardation film in Example 27 is tilted toward the slow axis direction;
* shows the case when the retardation film in Example 28 is tilted toward the fast axis direction;
+ shows the case when the retardation film in Example 28 is tilted toward the slow axis direction.

Figure 14:
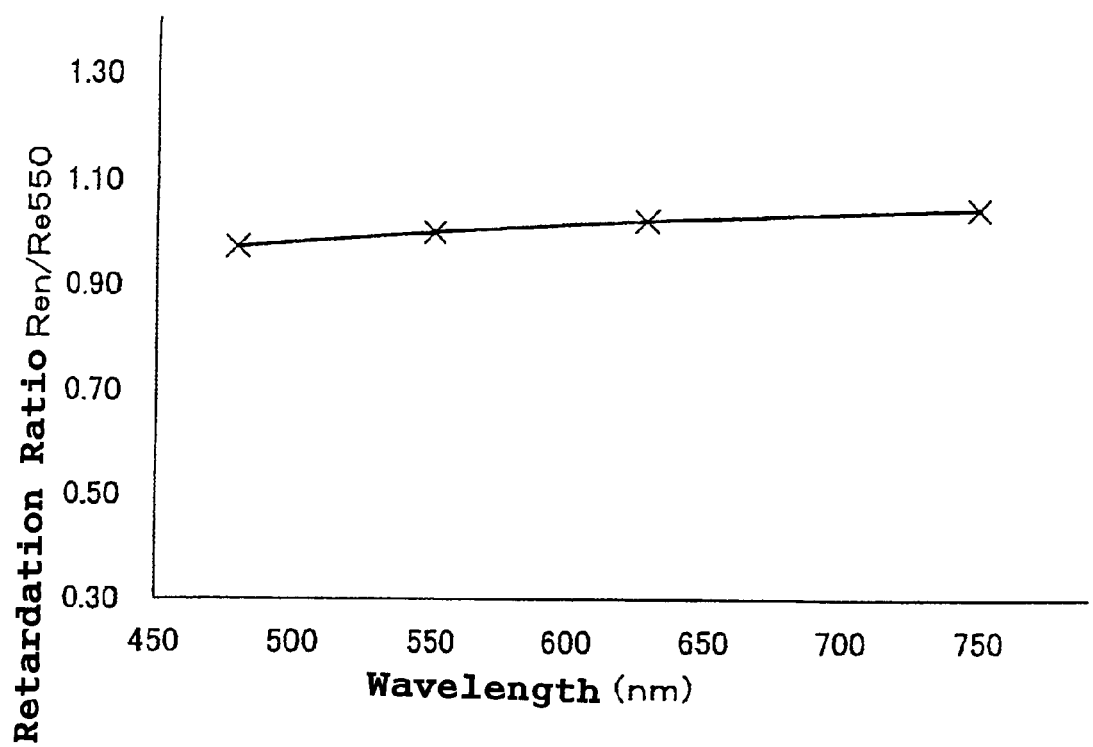
[FIG. 14]

FIG. 14
× shows Comparative Example 2.

BEST MODE FOR CARRYING OUT THE INVENTION

Hereinbelow, the present invention will be explained in detail.

The type of cellulose that can be used as a starting material in the present invention is, regardless of crystal form and polymerization degree, one having a structure in which a monomer unit represented by the formula (3):

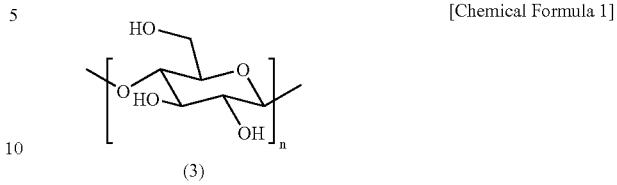

[Chemical Formula 1]

(3)

is connected each other, that is, a structure in which D-glucopyranose is connected each other by β-1,4 bonding. In the above formula, n represents the number of connection of the unit, and is generally not less than 10, preferably not less than 50 and more preferably not less than 100, and the upper limit is not particularly limited but generally not more than 10,000, preferably not more than 5,000 and more preferably not more than 2,000. Specifically, the type of cellulose includes natural cellulose, powdered cellulose, crystal cellulose, regenerated cellulose, cellulose hydrate, rayon or the like. When homogeneity in quality is required, it is preferable to use those having an artificially adjusted number of connection (number of polymerization). In such a case, preferably n is around 100 to 1,000, and sometimes around 150 to 600.

The cellulose derivative to be used for preparing the retardation film of the present invention is one in which one hydroxyl group of the cellulose is substituted by a (C5-C20) aliphatic acyl group and represented by the following formula (4):

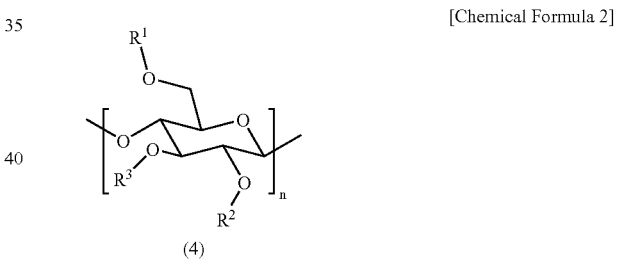

[Chemical Formula 2]

(4)

wherein, n is same to the above, and $R^1$, $R^2$ and $R^3$ are a hydrogen atom or a substituent. $R^1$, $R^2$ and $R^3$ may be same or different from each other, and all of $R^1$, $R^2$ and $R^3$ are not a hydrogen atom at the same time, and at least one of $R^1$, $R^2$ and $R^3$ is a (C5-C20), preferably a (C5-C16) and more preferably a (C5-C12) aliphatic acyl group, and the rest maybe substituted by other substituent. The (C5-C20) aliphatic acyl group can be represented by a X—CO— group, and X includes n-butyl, sec-butyl, tert-butyl, n-pentyl, sec-pentyl, neo-pentyl, n-hexyl, sec-hexyl, cyclohexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl and the like, and preferably X includes n-butyl, sec-butyl, tert-butyl, n-pentyl, sec-pentyl, neo-pentyl, n-hexyl, sec-hexyl, cyclohexyl, n-heptyl, n-octyl, n-nonyl and the like. Further, a straight chained (C5-C20) aliphatic acyl group is one of preferable groups, and among the alkyl groups exemplified above, straight chained alkyl groups are more preferable.

In the cellulose derivative which is substituted by the above (C5-C20) aliphatic acyl group, the number of the substituent per one cellulose monomer unit (hereinafter, referred to degree of substitution) is 1 to 3 without problem, generally 1.00 to 2.99 and preferably 1.50 to 2.90. In particular, in the case of cellulose n-pentanate, the degree of substitution of preferably 2.0 to 2.8 and more preferably 2.2 to 2.3 can impart an achromatic property. In the case of cellulose n-hexanate, the degree of substitution of preferably 2.0 to 2.8 and more preferably 2.4 to 2.6 can impart an achromatic property. In the case of cellulose n-heptanate, the degree of substitution of preferably 1.0 to 2.99 and more preferably 1.5 to 2.3 can impart an achromatic property.

When the degree of substitution of cellulose n-heptanate is 2.5 to 2.99, a film having a biaxial property in which the cellulose derivative is oriented in two directions of the stretching direction in the film plane (or a direction orthogonal thereto in the film plane) and the thickness direction can be obtained by uniaxially stretching in the usual way (hereinafter, also referred to "biaxial property is expressed"). In the case of the present invention, this biaxial property is characterized in that the following relations are satisfied:

$$ny > nz > nx;$$

$$nz \geq ny > nx;$$

provided that nx is a refractive index in the stretching direction, ny is a refractive index in the direction orthogonal to the stretching direction in the film plate, and nz is a refractive index in the thickness direction. In the case of a cellulose which is substituted by an acyl group having 8 to 20 carbon atoms such as cellulose n-octanate, cellulose n-nonanate, cellulose n-decanate, cellulose n-undecanate, cellulose n-dodecanate, cellulose n-tridecanate, cellulose n-tetradecanate, cellulose n-pentadecanate, cellulose n-hexadecanate, cellulose n-heptadecanate, cellulose n-octadecanate, cellulose n-nanodecanate and cellulose n-eicosanate, more preferably a cellulose which is substituted by an acyl group having 8 to 16 carbon atoms such as cellulose n-octanate, cellulose n-nonanate, cellulose n-decanate, cellulose n-undecanate, cellulose n-dodecanate, cellulose n-tridecanate, cellulose n-tetradecanate, cellulose n-pentadecanate and cellulose n-hexadecanate, the biaxial property is expressed with a degree of substitution of, for example, 1.0 to 2.99, preferably 1.5 to 2.99 and more preferably 2.5 to 2.99.

In the case of the present invention, this biaxial property is characterized in that the following relations are satisfied:

$$ny > nz > nx;$$

$$nz \geq ny > nx;$$

provided that nx is a refractive index in the stretching direction, ny is a refractive index in the direction orthogonal to the stretching direction, and nz is a refractive index in the thickness direction. When an aliphatic substituent having 5 to 20 carbon atoms and a substituent other than said aliphatic substituent are contained, the number of the aliphatic acyl substituent having 5 to 20 carbon atoms is not less than 1.00, and the total number of substituents including other substituent is 1.50 to 2.99 and more preferably 2.00 to 2.90 per one cellulose monomer unit.

Preferable examples of the substituent other than the (C5-C20) aliphatic acyl group in the formula (4) include a carbamoyl group and an acyl group other than the (C5-C20) aliphatic acyl group. Specifically the substituents include a group represented by Y—CO— group or Z—NH—CO— group. Here, Y is not particularly limited so long as it is a group other than the non-substituted (C5-C20) aliphatic group, and specifically includes a substituted or a non-substituted (C1-C20) hydrocarbon moiety excluding a non-substituted (C5-C20) aliphatic group. A substituent of said hydrocarbon moiety is not particularly limited, and includes, for example, hydroxyl group, halogen atom, amino group, cyano group, (C1-C14) acyloxy group, (C1-C14) alkyloxy group, phenyl group and naphthyl group. When said hydrocarbon moiety is an aromatic group, the substituent further includes (C1-C10) alkyl group.

Said hydrocarbon moiety includes, for example, vinyl group, methyl group, ethyl group, propyl group, isopropyl group, n-butyl group, iso-butyl group, tert-butyl group, benzyl group, 1-naphthylmethyl group, trifluoromethyl group, aminomethyl group, 2-aminoethyl group, 3-amino-n-propyl group, 4-amino-n-butyl group, or a group in which an amino group thereof is further converted to an amide or urethane group, hydroxy-substituted (C1-C4) alkyl group, or a group in which a hydroxyl group thereof is further substituted by a (C1-C14) acyl group or a (C1-C14) alkyl group, vinyl group which may be substituted by a (C1-C3) alkyl group, cyanobiphenyloxy (C3-C10) alkyl group, phenylacetylenylphenyl (C1-C20) alkyl group, aliphatic group with a unsaturated bond having 1 to 10 carbon atoms such as acetylene group and cinnamoyl group, and acyl group with an aromatic group such as phenyl group, naphthyl group, anthracenyl group, fluorenyl group, biphenyl group and 4-trifluoromethylphenyl group. Z includes a (C1-C10) aliphatic group which may have a substituent, and specifically, for example, vinyl group, methyl group, ethyl group, propyl group, isopropyl group, n-butyl group, iso-butyl group, tert-butyl group, pentyl group, neopentyl group, hexyl group, cyclohexyl group, octyl group, nonyl group, decyl group, benzyl group, 1-naphtylmethyl group and trifluoromethyl group.

With regard to the (C5-C20) aliphatic acyl group and optionally other substituent, one or more substituents are properly selected according to desired birefringence characteristics, wavelength dispersion characteristics, viscosity, orientating ability, processability, reactivity and the like of the cellulose derivative of the present invention. Further, the degree of substitution of a hydroxyl group of the cellulose is also properly selected according to desired birefringence characteristics, wavelength dispersion characteristics, viscosity, orientating ability, processability, reactivity and the like of the cellulose derivative of the present invention.

A retardation film superior in mechanical strength, reliability and solvent resistance can be obtained by introducing a polymerizable group into the cellulose derivative and irradiating UV rays in the presence of a photopolymerization initiator after orientation treatment to fix the oriented state. The polymerizable group includes, for example, a group in which the above Y or Z is a vinyl group, that is, acryloyl group and methacryloyl group. As the photoinitiator, compounds used for usual ultraviolet-curable resins may be used.

Specific examples of said photopolymerization initiator include, acetophenone type compounds such as 2-methyl-1-[4-(methylthio)phenyl]-2-morpholinopropane-1,1-hydroxycyclohexylphenylketone, 4-(2-hydroxyethoxy)-phenyl (2-hydroxy-2-propyl)ketone, 1-(4-dodecylphenyl)-2-hydroxy-2-methylpropane-1-one, 1-(4-isopropylphenyl)-2-hydroxy-2-methylpropan-1-one, 2-hydroxy-2-methyl-1-phenylpropan-1-one, diethoxyacetophenone, benzoin type compounds such as benzoin, benzoin methyl ether, benzoin ethyl ether, benzoin isopropyl ether, benzoin isobutyl ether and 2,2-dimethoxy-2-phenylacetophenone, benzophenone type compounds such as benzoylbenzoic acid, methyl benzoylbenzoate, 4-phenylbenzophenone, hydroxybenzophenone, 4-benzoyl-4'-methyldiphenyl sulfide and 3,3'-dimethyl-4-methoxybenzophenone, and thioxanthone type compounds such as thioxanthone, 2-chlorothioxanthone, 2-methylthioxanthone, 2,4-dimethylthioxanthone, isopropylthioxanthone, 2,4-dichlorothioxanthone, 2,4-diethylthioxanthone and 2,4-diisopropylthioxanthone. These photopolymerization initiator may be used alone or in combination of two or more kinds thereof in an each desired ratio.

When benzophenone type compounds or thioxanthone type compounds are used, an adjuvant may be used to promote a photopolymerization reaction. Examples of such an adjuvant include amine type compounds such as triethanolamine, methyldiethanolamine, triisopropanolamine, n-butylamine, n-methyldiethanolamine, diethylaminoethylmethacrylate, Michler's ketone, 4,4'-diethylaminophenone, ethyl 4-dimethylaminobenzoate, (n-butoxy)ethyl 4-dimethylaminobenzoate and isoamyl 4-dimethylaminobenzoate. The content of the photoinitiator is preferably about 0.5 parts by weight or more and about 10 parts by weight or less and more preferably about 2 parts by weight or more and about 8 parts by weight or less based on 100 parts by weight of the (meth) acrylate compound (including a liquid crystal polymer in the case where an acryloyl group is present in the polymer). Also, the content of the adjuvant is preferably about 0.5 equivalents to about 2 equivalents to the photoinitiator.

The quantity of the radiation of ultraviolet rays is preferably about 100 to 1000 mJ/cm$^2$ though it varies depending on the type of the liquid crystal mixed-composition, the type and amount of the photoinitiator to be added and film thickness. A layer of the composition is cured in any of air atmosphere and inert gas (for example, nitrogen) atmosphere when it is irradiated with ultraviolet rays. However, if the film thickness is thinner, the layer cannot be cured sufficiently due to a hindrance with oxygenic. In such a case, it is preferable to irradiate the layer with ultraviolet rays in an inert gas atmosphere.

In addition to the above photoinitiator, a reactive monomer different from the cellulose derivative may be added to the cellulose derivative to prepare the retardation film of the present invention. The reactive monomer is preferably a photopolymerizable compound by UV irradiation to prevent relaxation of orientation of the retardation film, because temperature change during photopolymerization is comparatively small. Such compound includes, for example, (meth) acrylate compounds.

The (meth)acrylate compounds include, for example, reaction products of trimethylolpropanetri(meth)acrylate, pentaerythritoltri(meth)acrylate, pentaerythritoltetra(meth)acrylate, ditrimethylolpropanetetra(meth)acrylate, dipentaerythritolpentaacrylate, dipentaerythritolhexaacrylate, reaction product of pentaerythritoltri(meth)acrylate and 1,6-hexamethylenediisocyanate, reaction products of pentaerythritoltri(meth)acrylate and isophoronediisocyanate, reaction products of tris(acryloxyethyl)isocyanurate, tris (methacryloxyethyl)isocyanurate, reaction product of glyceroltriglycidyl ether and (meth)acrylic acids, reaction products of caprolactone-modified tris(acryloxyethyl) isocyanurate, reaction product of trimethylolpropanetriglycidyl ether and (meth)acrylic acids, reaction products of triglyceroldi(meth)acrylate, reaction product of propylene glycol diglycidyl ether and (meth) acrylic acids, reaction products of polypropylene glycol di(meth)acrylate, tripropylene glycol di(meth)acrylate, polyethylene glycol di(meth)acrylate, tetraethylene glycol di(meth)acrylate, triethylene glycol di(meth)acrylate, pentaerythritol di(meth)acrylate, reaction product of 1,6-hexanediol diglycidyl ether and (meth)acrylic acids, reaction products of 1,6-hexanedioldi(meth)acrylate, glycerol di(meth)acrylate, reaction product of ethylene glycol diglycidyl ether and (meth) acrylic acids, reaction products of diethylene glycol diglycidyl ether and (meth)acrylic acids, reaction products of bis(acryloxyethyl)hydroxyethylisocyanurate, bis(methacryloxyethyl)hydroxyethylisocyanurate, reaction product of bisphenol A diglycidyl ether and (meth) acrylic acids, reaction products of tetrahydrofurfuryl(meth) acrylate, caprolactone-modified tetrahydrofurfuryl(meth) acrylate, 2-hydroxyethyl(meth)acrylate, 2-hydroxypropyl (meth)acrylate, polypropylene glycol (meth)acrylate, polyethylene glycol (meth)acrylate, phenoxyhydroxypropyl (meth)acrylate, acryloylmorpholine, methoxypolyethylene glycol (meth) acrylate, methoxytetraethylene glycol (meth) acrylate, methoxytriethylene glycol (meth)acrylate, methoxyethylene glycol (meth)acrylate, methoxyethyl(meth) acrylate, glycidyl(meth)acrylate, glycerol(meth)acrylate, ethylcarbitol(meth)acrylate, 2-ethoxyethyl(meth)acrylate, N,N-dimethylaminoethyl(meth)acrylate, 2-cyanoethyl (meth) acrylate, reaction product of butyl glycidyl ether and (meth)acrylic acids, butoxytriethylene glycol (meth)acrylate and butanediolmono(meth)acrylate. These compounds may be used either alone or in combination of two or more kinds thereof. A desired orientation state can be fixed by using such a reactive compound and polymerizing under appropriate conditions.

Specific synthesis method for the cellulose derivative used in the present invention will be described below.

The cellulose derivative of the present invention can be obtained by reacting the cellulose represented by the formula (1) and a reagent corresponding to the substituent. For example, cellulose is dissolved in a mixed liquid of lithium chloride and N,N-dimethylacetoamide, then an acyl chloride corresponding to the substituent is added thereto and reacted to obtain a cellulose acylate in which hydroxyl groups of the cellulose are substituted by the acyl groups. When a carbamoyl group is introduced, an isocyanate ester corresponding to the substituent instead of the acyl chloride and di-n-butyltin dilaurate as a catalyst if necessary are added, and reacted to obtain a cellulose carbamate in which hydroxyl groups of the cellulose are substituted by the carbamoyl groups. Further, as an alternative method to perform acylation, the cellulose acylate can be similarly obtained by reacting cellulose in a mixed liquid of trifluoroacetic anhydride and carboxylic acid. Degree of substitution of each cellulose derivative can be controlled by properly selecting reaction conditions of these reactions. For example, in the case of the cellulose acylate, the above-described method using an acyl chloride is preferable one when a cellulose acylate having a degree of substitution of about 1.0 to about 2.5 is obtained. On the other hand, the method using trifluoroacetic anhydride and carboxylic acid is preferable one when a cellulose acylate having a degree of substitution of about 2.5 to about 3.0 is obtained. More rigorous control of degree of substitution can be achieved by appropriately adjusting an amount of each reagent to be used in the reaction, reaction temperature, reaction time and the like. After completion of the reaction, product is precipitated by pouring the reaction mixture into water or methanol, and purified by repeating reprecipitation several times. Resulting solid is dried to obtain the cellulose derivative of the present invention.

Adjustment of the degree of substitution of the cellulose derivative of the present invention can be done by adjusting an amount of the reagent for introducing substituent used in the synthesis of said cellulose derivative. The reagent for introducing substituent can be used in a range of 0.5 equivalents to 100 equivalents to a quantity of the hydroxyl group of the cellulose to be used as a starting material of the reaction. A cellulose derivative having a higher degree of substitution can be obtained by using more reagent. However, since the reagent for introducing substituent has different reactivity to the hydroxyl group of the cellulose depending on a type thereof, an amount of the reagent for introducing substituent necessary to achieve a given degree of substitution differs depending on each type. For example, when cellulose n-hexanate having a degree of substitution of 2.14, the reaction is conducted using 1.05 equivalents of n-hexanoyl chloride to the hydroxyl group of the cellulose for 4 hours or more. On the other hand, when cellulose n-hexanate having a degree of substitution of 2.74, the reaction is conducted using 1.50 equivalents of n-hexanoyl chloride to the hydroxyl group of the cellulose for 4 hours or more.

Preparation of the retardation film using the cellulose derivative of the present invention is performed by film making from a solution of the cellulose derivative and orientating treatment. Specific method is as follows. Firstly, the cellulose derivative is dissolved in a solvent. The solvent to be used includes halogenated hydrocarbon solvents such as methylenechloride and chloroform; acetate esters such as ethyl acetate, butyl acetate and methyl acetate; alcohols such as methanol, ethanol, propanol, isopropanol and benzylalcohol; ketones such as 2-butanone, acetone, cyclopentanone and cyclohexanone; basic solvents such as benzylamine, triethylamine and pyridine; and nonpolar solvents such as cyclohexane, benzene, toluene, xylene, anisole, hexane and heptane. Concentration by weight of the cellulose derivative is generally 1% to 99%, preferably 2.5% to 80%, and more preferably 5% to 50%. The cellulose derivative may be used alone or in combination of 2 or more kinds. A plasticizer may be further added thereto if necessary. The plasticizer includes phthalate esters such as dimethyl phthalate, diethyl phthalate and ethylphthalylethyl glycolate; trimellitate esters such as tris (2-ethylhexyl) trimellitate; aliphatic dibasic acid esters such as dimethyl adipate and dibutyl adipate; orthophosphate esters such as tributyl phosphate and triphenyl phosphate; sebacate esters such as di-n-butyl sebacate; and acetate esters such as glycertriacetate and 2-ethylhexyl acetate. These compounds may be formulated alone or in combination of 2 or more kinds. However, since these plasticizers may impair the birefringence characteristics as described above, preferably they are generally not to be used. The cellulose derivative to be used in the present invention has generally a superior stretchability, it is not necessary to use the plasticizer. Further, when it is necessary to fix an orientation, a polymerizable compound necessary for fixing an orientation, preferably an acryl type compound described above and a polymerization initiator, preferably a photoinitiator may be formulated.

Subsequently, a solution of said cellulose derivative is coated on a substrate having a flat and releasable surface, thereafter the solvent is removed by natural drying or heated drying to form a transparent cellulose derivative film.

Next, the film is subjected to an orientation treatment and an orientation fixing treatment if necessary, whereby the retardation film of the present invention can be obtained. In the present invention, the phrase "retardation film formed from the cellulose derivative" involves the retardation film and the like in which orientation is fixed in such a way.

The orientation treatment includes, for example, orientation by stretching and orientation by shearing. In the case of the orientation by stretching, a general uniaxial stretching can be employed, in which, for example, said cellulose derivative film is uniaxially stretched at the elevated temperature while both ends of the film are fixed. Alternatively, in the case of a long film in a roll shape, the both ends of the film are, for example, fixed with two nip rollers respectively at a certain distance and continuously stretched by a difference between the numbers of revolutions of the both rollers. Temperature in stretching may be around 50° C. to 200° C., preferably around 50° C. to 180° C., though the optimum stretching temperature varies depending on a type of substituent and a degree of substitution of the cellulose derivative. For example, in the case of cellulose n-hexanate having a degree of substitution by a hexanoyl group of 2.00 to 2.99, the stretching temperature is 90° C. to 160° C. Stretching ratio may be around 1.05 times to 5.0 times, preferably 1.1 times to 4.0 times, though it varies depending on a type, a thickness and a desired retardation value of the cellulose derivative. For example, in the case of cellulose n-hexanate having a degree of substitution by a hexanoyl group of 2.00 to 2.99, the stretching ratio is about 1.1 times to 3.0 times. As for stretching speed, as well as the stretching temperature, the optimum stretching speed is varied depending on a type of the cellulose derivative, and in the case of cellulose n-hexanate having a degree of substitution by a hexanoyl group of 2.00 to 2.99, the stretching speed is generally not more than 5 times stretching/min, preferably not more than 3 times stretching/min, and more preferably not more than 2 times stretching/min. In the case of orientation by shearing, orientation is performed by sandwiching the cellulose derivative with two glass plates and pulling one glass plate against the other while the glass plated are kept in tight contact with the cellulose derivative under heated condition. In the case of cellulose n-hexanate having a degree of substitution by a hexanoyl group of 2.00 to 2.99, the shearing temperature is generally 50° C. to 200° C., preferably 80° C. to 190° C., and more preferably 140° C. to 180° C., though the optimum shearing temperature varies depending on a type of the cellulose derivative. The thus obtained retardation film has a retardation value in the front direction of the film at a wavelength of 550 nm of around 10 to 600 nm.

Further, thickness of the retardation film obtained according to the present invention is preferably around 30 to 150 μm, and more preferably around 30 to 100 μm. In particular, in the case of the retardation film consisting of cellulose n-pentanate having a degree of substitution of 2.2 to 2.3 or cellulose n-hexanate having a degree of substitution of 2.4 to 2.6, a stretching ratio of 1.5 to 2.0 times and a thickness of 50 to 100 μm are particularly preferable, because around a quarter wavelength retardation film (a retardation value at a wavelength of 550 nm is 130 to 140 nm) can be obtained.

Further, in the case of a cellulose derivative with substituents having 7 to 20 carbon atoms such as cellulose n-heptanate having a degree of substitution of 2.5 to 2.99, cellulose n-octanate, cellulose n-nonanate, cellulose n-decanate, cellulose n-undecanate, cellulose n-dodecanate, cellulose n-tridecanate, cellulose n-tetradecanate, cellulose n-pentadecanate, cellulose n-hexadecanate, cellulose n-heptadecanate, cellulose n-octadecanate, cellulose n-nanodecanate and cellulose n-icosanate all having adegree of substitution of 1.0 to2.99, preferably 1.5 to 2.99, and more preferably 2.5 to 2.99, preferably a cellulose derivative having 7 to 16 carbon atoms such as cellulose n-heptanate having a degree of substitution of 2.5 to 2.99, cellulose n-octanate, cellulose n-nonanate, cellulose n-decanate, cellulose n-undecanate, cellulose n-dodecanate, cellulose n-tridecanate, cellulose tetradecanate, cellulose n-pentadecanate and cellulose n-hexadecanate all having a degree of substitution of 1.0 to 2.99, preferably 1.5 to 2.99, and more preferably 2.5 to 2.99, by a general uniaxial stretching, that is, for example, by uniaxially stretching said cellulose derivative film at elevated temperature while both ends of the film are fixed, or in the case of a long film in a roll shape, for example, by fixing the both ends of film with two nip rollers at a certain distance and continuously stretching by a difference between the numbers of revolutions of the both rollers, so-called biaxial property is exhibited, where the cellulose derivative is oriented in a stretching direction within the film plane (or a direction orthogonal thereto within the film plane) and a depth direction as described above, without using a measure such as lamination of a shrinkable film as described in Patent Reference 5 and only by the above general uniaxial stretching. In this case, stretching temperature is preferably around 40° C. to 200° C., and more preferably around 50° C. to 180° C., though the optimum stretching temperature varies depending on a kind of substituent and degree of substitution of the cellulose derivative. Stretching ratio is preferably around 1.05 times to 5.0 times, and more preferably around 1.1 times to 4.0 times, though the stretching ratio varies depending on a kind, a thickness and a desired retardation value of the cellulose derivative. Further, thickness of the resulting retardation film is preferably around 10 μm to 500 μm, more preferably around 20 μm to 300 μm, and further more preferably around 30 μm to 150 μm.

Figure 1:
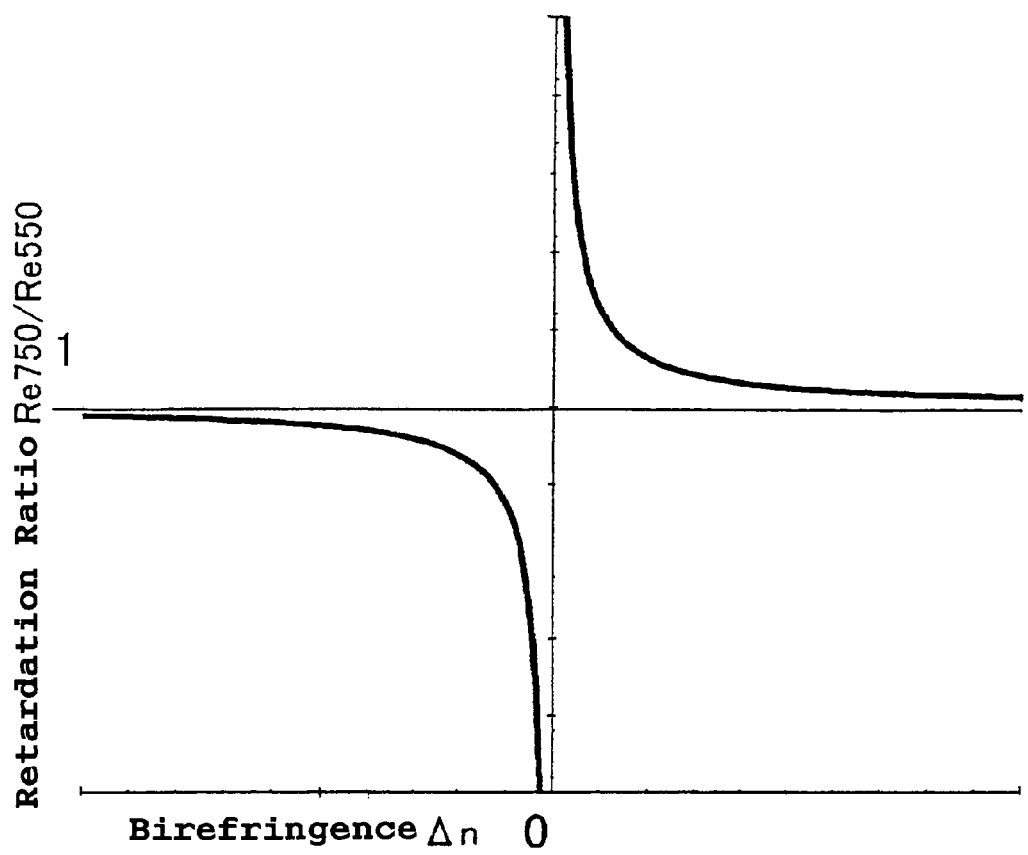
[FIG. 1]
Figure 2:
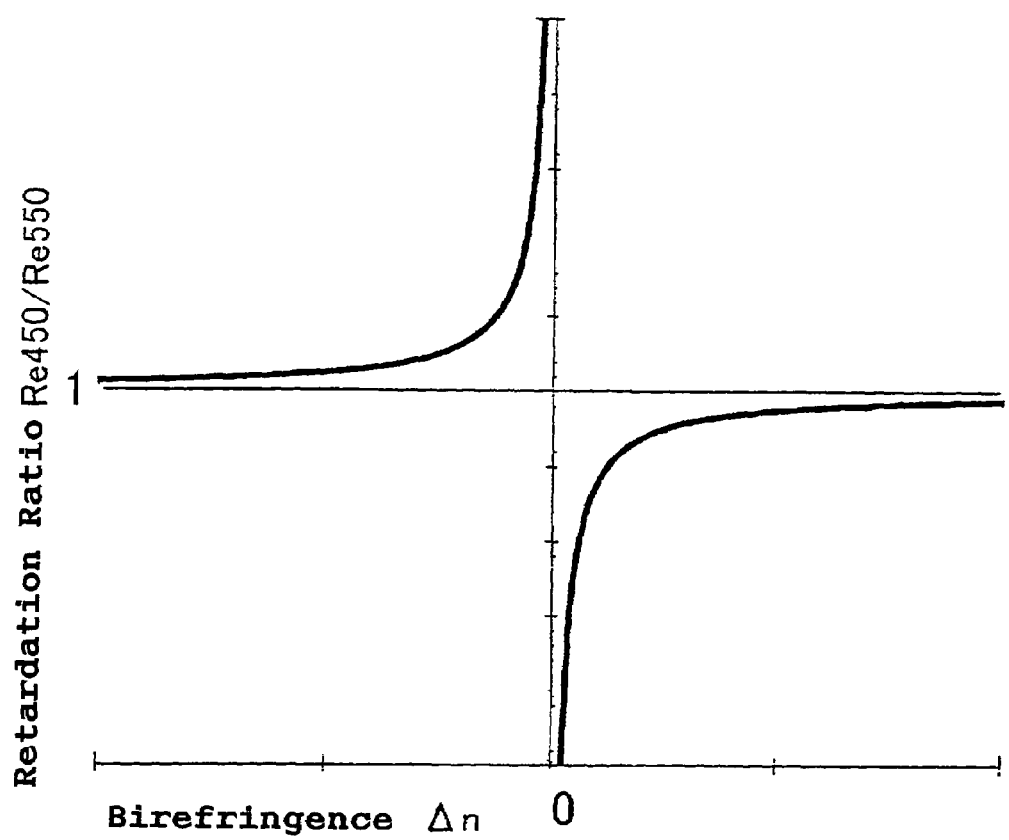
[FIG. 2]

Relationship between birefringence and wavelength dispersion of the cellulose derivative of the present invention and the retardation film prepared from said cellulose derivative is characterized in that the relationships represented by the following formulae [1] and [2]:

$$(Re750/Re550) = A1/\Delta n + 1 \quad [1]$$

$$(Re450/Re550) = A2/\Delta n + 1 \quad [2]$$

are satisfied. These relationships are illustrated by FIG. 1 and FIG. 2. In these formulae, (Re750/Re550) is a ratio of a retardation value at a wavelength of 750 nm to a retardation value at a wavelength of 550 nm showing a value of 0.05 to 1.95; (Re450/Re550) is a ratio of a retardation value at a wavelength of 450 nm to a retardation value at a wavelength of 550 nm showing a value of 0.05 to 1.95; $\Delta n$ is a birefringence of the retardation film at a wavelength of 550 nm showing a value of −0.0001 to 0.06; A1 and A2 are each a constant showing a value of −0.06 to 0.06, and when A1 is a positive value A2 becomes a negative value, and when A1 is a negative value A2 becomes a positive value.

Values of the constants A1 and A2 in the formula (1) and the formula (2) are determined by a kind of the substituent of the cellulose derivative, and a value of birefringence $\Delta n$ depends on a degree of substitution of said cellulose derivative. From the cellulose derivative of the present invention, a film having positive birefringent property and a film having negative birefringent property can be prepared within the ranges shown in FIG. 1 and FIG. 2. In the usual case, by increasing degree of substitution of said cellulose derivative, birefringence of the retardation film of the present invention prepared from said cellulose derivative can be changed from positive to negative, and at the same time, wavelength dispersion is also changed. A retardation film having an optional wavelength dispersion can be obtained from said cellulose derivative by changing kind of substituent and degree of substitution within a range where the formula (1) and the formula (2) are satisfied. For example, in the case of a retardation film prepared from cellulose n-octanate having a number of substitution for hydroxyl group of 1.80 per one cellulose monomer unit and a film thickness of 61 μm, ratio of retardation values Re750/Re550 is 0.93, Re450/Re550 is 1.08, $\Delta n$ is −0.00077, A1 is $-5.39 \times 10^{-5}$, and A2 is $6.16 \times 10^{-5}$. This film is one having negative birefringent property where a longer wavelength gives a smaller retardation value. In the case of a retardation film prepared from cellulose n-hexanate having a number of substitution of 2.76 and a film thickness of 77 μm, ratio of retardation values Re750/Re550 is 1.14, Re450/Re550 is 0.91, $\Delta n$ is 0.00035, A1 is $4.9 \times 10^{-5}$, and A2 is $-0.315 \times 10^{-5}$. Since this film is one where a longer wavelength gives a larger retardation value and gives a fixed ratio of retardation in a wide range, the film can be used as a so-called achromatic retardation film.

The retardation film of the present invention can be used for various types of image display devices depending on its wavelength dispersion characteristics. For example, a circularly polarizing film of the present invention can be obtained by using a retardation film of the present invention having the above achromatic wavelength dispersion characteristics and a retardation value at 550 nm of about 137 nm and laminating this film using an acrylic or a silicone type pressure-sensitive adhesive or adhesive so that an angle between the absorption axis of the polarizing film and the slow axis of said retardation film becomes 45°. By using the thus obtained circularly polarizing plate for an organic electroluminescence type display device, visibility of the displayed image can be greatly improved because reflection in the electrode section can be suppressed. Similarly, a rotary polarizing film of the present invention can be obtained by using the retardation film of the present invention having the above achromatic wavelength dispersion characteristics and a retardation value at 550 nm of about 275 nm and laminating this film so that an angle between the absorption axis of the polarizing film and the slow axis of said retardation film becomes 45°. By using this rotary polarizing film for a liquid crystal projector, it becomes possible to improve utilization efficiency for light, prevent deterioration of the polarizing film due to light absorption, and improve contrast of displayed image, because the film enables to change a direction of the linearly polarized light evenly in a wide wavelength range. Further, a liquid crystal display device obtained by using an elliptically polarizing film that is the retardation film of the present invention whose wavelength dispersion characteristics are same or close to wavelength dispersion characteristics of the liquid crystal cell laminated with a polarizing film at a certain angle can compensate the wavelength dependency possessed by the liquid crystal cell and improve contrast. Still further, by using the above circularly polarizing plate for a reflection type or a reflection semi-transparent type liquid crystal display device, it is possible to improve contrast of displayed image due to a superior anti-reflection effect at each wavelength.

Furthermore, an optical film of the present invention can be obtained by laminating the retardation film of the present invention having a retardation value at 550 nm of 50 to 300 nm, preferably 100 to 300 nm and a polarizing film using an acrylic or a silicone type pressure-sensitive adhesive or adhesive so that the slow axis of the retardation film and the absorption axis or the penetration axis of the polarizing film are in parallel or in orthogonal to each other. By using this optical film and a retardation film having an average refractive index in the film plane of no, a refractive index in the thickness direction of ne, and a relation of ne−no<0, viewing angle characteristics of a VA (vertical alignment) type liquid crystal display device can be improved. The film having a relation of ne−no<0 includes, for example, a retardation film biaxially stretched in the film plane described in JP-A-2004-082714, a film with an oriented and fixed cholesteric liquid crystal having a selective reflection range in ultraviolet region described in JP-A-2003-315556, a film having a discotic liquid crystal oriented with the disk plane thereof being horizontal to the substrate plane and fixed described in JP-2866372 and a film prepared by laminating two uniaxially stretched films so that the slow axes of these films are orthogonal to each other. Specifically, in order to improve viewing angle characteristics of a VA type liquid crystal display device, Rth calculated by Rth=(no−ne)×d (wherein, ne−no<0, d is a thickness of film) is preferably around 100 to 300 nm, and such Rth can be obtained by appropriately adjusting ne, no and d. In this case, a retardation value in the front direction of the film at 550 nm is preferably around 0 to 50 nm. By laminating such film satisfying the relation of ne−no<0 and the retardation film of the present invention (when the film satisfying the relation of ne−no<0 has a retardation in the front direction, two films are laminated so that the slow axis of said film and the slow axis of the retardation film of the present invention are in parallel or in orthogonal to each other), and further laminating a polarizing film, a composite optical film of the present invention can be obtained. Lamination can be performed using an acrylic or a silicone type pressure-sensitive adhesive or adhesive, but in particular, by using the retardation film of the present invention as a substrate, and forming on said retardation film (if necessary, an alignment film is further formed on said retardation film, and on said alignment film) an oriented discotic liquid crystal layer or a cholesteric liquid crystal layer having a selective reflection range in the ultraviolet region, an additional substrate for forming a liquid crystal layer becomes unnecessary, thereby thinning and simplification of process are enabled.

Next, in the case of the retardation film of the present invention having biaxial characteristics prepared from the cellulose derivative of the present invention with substituent having 8 to 20 carbon atoms, if retardation is around a quarter wavelength (for example, retardation value for light having a wavelength of 550 nm is about 130 nm to 150 nm), by laminating the retardation film of the present invention with a polarizing film so that the absorption axis of a polarizing film and the slow axis of said retardation film becomes 45° or 135°, a wide visible angle circularly polarizing film which is one embodiment of the present invention can be obtained. If retardation of the retardation film of the present invention is around a half wavelength (for example, retardation value for light having a wavelength of 550 nm is about 200 nm to 300 nm), by laminating the retardation film of the present invention with a polarizing film so that an angle between the absorption axis of a polarizing film and the slow axis of said retardation film becomes 45° or 135°, a wide visible angle rotary polarizing film (having a function to rotate the polarizing axis by 90°) which is another embodiment of the present invention can be obtained.

Further, for example, by laminating the retardation film of the present invention having a retardation of around a half wavelength (for example, retardation value for light having a wavelength of 550 nm is about 200 nm to 300 nm, preferably 230 nm to 290 nm) and other uniaxially stretched retardation film made of polycarbonate, polyarylate, polyether sulfone, cycloolefine polymer or the like having a retardation of around a quarter wavelength (for example, retardation value for light having a wavelength of 550 nm is about 100 nm to 150 nm), or other retardation film having a retardation of around a half wavelength (for example, retardation value for light having a wavelength of 550 nm is about 200 nm to 300 nm, preferably 230 nm to 290 nm) and a retardation film of the present invention having around a quarter wavelength (for example, retardation value for light having a wavelength of 550 nm is about 100 nm to 150 nm) using a pressure-sensitive adhesive or an adhesive so that the fast axis (the nx direction, that is, the stretching direction) of the retardation film of the present invention and the slow axis (the stretching direction) of the other retardation film are practically in parallel, a composite retardation film which is another embodiment of the present invention can be obtained. This composite retardation film becomes an achromatic (having almost equivalent retardation for each wavelength) quarter wavelength retardation film having a wide viewing angle. In this case, when the slow axis of the other retardation film is aligned in the longitudinal direction and the fast axis of the retardation film of the present invention is also aligned in the longitudinal direction, it becomes possible to provide a pressure-sensitive adhesive layer on the lamination surface of the other retardation film and laminate with the retardation film of the present invention by a roll to roll method, to realize cost reduction accompanied to process simplification. By laminating this achromatic quarter wavelength retardation film having a wide visible angle with a polarizing film by the similar method as described above so that an angle between the absorption axis of the polarizing film and the slow axis or the fast axis of said a quarter wavelength retardation film becomes 45° or 135°, an achromatic wide viewing angle circularly polarizing film which is another embodiment of the present invention can be obtained.

Further, by laminating a retardation film of the present invention having a retardation value for light having a wavelength of 550 nm of about 200 nm to 300 nm, and preferably 230 nm to 290 nm and a polarizing film using a pressure-sensitive adhesive or an adhesive so that the fast axis of the retardation film of the present invention and the absorption axis of the polarizing film are practically in parallel, a wide viewing angle polarizing film which is another embodiment of the present invention can be obtained. In this case, when the polarizing film is a long film whose absorption axis is aligned in the longitudinal direction and the retardation film of the present invention is also a long film whose fast axis is aligned in the longitudinal direction, it becomes possible to provide a pressure-sensitive adhesive layer or an adhesive layer on the lamination surface of one film and laminate the films by a roll to roll method, to realize cost reduction accompanied to process simplification. The thus obtained wide viewing angle polarizing film has the following features. Usually, when two polarizing films are laminated so that the absorption axes of both films are orthogonal to each other (cross-Nicol), transmission of light in the front direction of the film plane can be blocked, but in the different direction from the absorption axis of each film, in particular, in the direction tilted from the absorption axis direction by 45° within the film plane, there is a problem that light passes through. This problem becomes more significant as the tilt angle becomes larger. However, by laminating at least one wide viewing angle polarizing film which is one embodiment of the optical film of the present invention and another polarizing film (which may be a usual polarizing film or a wide viewing angle polarizing film which is one embodiment of the optical film of the present invention) with a retardation film of the present invention being sandwiched thereby, so that the absorption axes of both polarizing films are orthogonal to each other (cross-Nicol), light scarcely transmits and can be blocked similarly to the front direction even if observed from a different direction from each absorption axis, particularly from the direction tilted from the front direction by 45°.

Further, the retardation film of the present invention has a feature that its hydrophilic property is improved by immersing into an alkaline aqueous solution to hydrolyze the surface layer thereof. Accordingly, using the retardation film subjected to a hydrolysis treatment as a support film, a polarizing element constructing a polarizing film can be directly adhered using a water-soluble poly(vinyl alcohol) type adhesive. Specifically, a polarizing film generally used has a structure in which a polarizing element is sandwiched by support films using an adhesive. As the polarizing element, for example, a polarizing element having a thickness of 10 to 40 μm obtained by uniaxially stretching a poly (vinyl alcohol) film with a dichroic colorant such as iodine (multi-photon ionized) and dichroic dye adsorbed and oriented, if necessary, followed by subjecting to cross-linking treatment with boric acid, and a polyene type of polarizing element having a thickness of around 10 to 40 µm obtained by uniaxially stretching a poly(vinyl alcohol) film followed by subjecting to dehydration treatment are used. And as the support film, for example, a cellulose triacetate film having a thickness of around 40 to 100 µm whose surface layer is hydrolyzed is used. In this case, by using the retardation film of the present invention as at least one of the support films instead of the hydrolyzed cellulose triacetate film, the support film can be adhered to a polarizing element using a poly(vinyl alcohol) type water-soluble adhesive similarly to the usual support film. Since in the thus obtained thin circularly polarizing film, thin rotary polarizing film, thin elliptically polarizing film, thin optical film and thin composite optical film of the present invention, the retardation film of the present invention can work as a support film of the polarizing film, they enable to realize cost down due to thinning and process simplification, compared with the case where the retardation film of the present invention is separately laminated with the conventional polarizing film using a pressure-sensitive adhesive or the like. In this connection, the hydrolysis treatment can be performed, for example, by immersing in an alkaline aqueous solution such as an aqueous solution of sodium hydroxide or potassium hydroxide for a certain time followed by washing with water. Regarding the aqueous solution of sodium hydroxide or potassium hydroxide, concentration is 0.5 to 6 N, temperature is around 10 to 60° C., and immersing time is adequately adjusted depending on degree of the hydrolysis treatment. The degree of hydrolysis treatment can be known by measuring contact angle of water on the treated film surface using a contact angle meter. The hydrolysis treatment of the retardation film of the present invention may be conducted so that the contact angle of water becomes not higher than 30°, preferably not higher than 20°, and more preferably not higher than 15°.

By using the thus obtained optical film of the present invention for an image display device such as an organic EL (electroluminescence) type display device or a liquid crystal display device, viewing angle characteristics and contrast of images displayed can be improved. For example, in the case of an organic EL type display device, by using the above described achromatic wide viewing angle circularly polarizing film which is one embodiment of the optical film of the present invention in the display surface side as a circularly polarizing film to prevent reflection from metal electrodes, contrast of images displayed can be improved because a high anti-reflection effect can be obtained at each wavelength. Further, in the case of a liquid crystal display device, by using the above described achromatic wide viewing angle circularly polarizing film which is one embodiment of the optical film of the present invention as a circularly polarizing film in a reflection type or a reflection semi-transparent type liquid crystal display device, contrast of images displayed can be improved, and viewing angle characteristics can be also improved, that is, similar images can be observed from a tilted direction as from the front direction, because a high anti-reflection effect can be maintained not only when observed from the front direction but also when observed from a tilted direction. Further, in the case of a TN (twisted nematic) type and an OCB (bend orientation) type liquid crystal devices, though compensation of the TN type liquid crystal cell can be performed by using a film having a hybrid-oriented discotic liquid crystal layer as described in JP-A-2003-315556, visible angle characteristics of the polarizing film itself cannot be improved. The OCB type liquid crystal cell is in the same situation. However, by using the wide viewing angle polarizing film, which is one embodiment of the optical film of the present invention, together with the TN type liquid crystal cell compensation film in combination, further widening of the viewing angle can be realized. Similarly in the VA type liquid crystal display device, though compensation of the VA type liquid crystal cell itself can be performed by using a compensation film as described in JP 2866372, JP-A-2002-196137 and JP 2587398, viewing angle characteristics of the polarizing film itself cannot be improved. However, by using the wide viewing angle polarizing film, which is one embodiment of the optical film of the present invention, together with the VA type liquid crystal cell compensation film in combination, further widening of the viewing angle can be realized. For example, by using the wide viewing angle polarizing film which is one embodiment of the optical film of the present invention after performing compensation of the liquid crystal cell itself by using a compensation film to compensate each liquid crystal cell such as TN type, OCB type, VA type and IPS (in-plane switching) type liquid crystal cells, further widening of the viewing angle can be realized. In this case, by using a thin type wide viewing angle polarizing film which is one embodiment of the optical film of the present invention (obtained by subjecting the retardation film of the present invention to a hydrolysis treatment and bonding to a polarizing element using an adhesive) instead of a wide visible angle polarizing film, a thickness of the whole liquid crystal display device of the present invention can be reduced.

As described above, the image display device of the present invention including an organic electroluminescence type display device, a liquid crystal projector, a liquid crystal display device and the like equipped with a circularly polarizing film, a rotary polarizing film, an elliptically polarizing film, an optical film and a composite optical film using the retardation film of the present invention can exhibit superior characteristics such as improvements in contrast and visible angle characteristics compared with the conventional image display device.

EXAMPLES

The present invention will be further explained in detail by means of Examples hereinbelow.

Here, the cellulose used in the following Examples 1 to 4 as a starting material was cellulose having the number of unit (degree of polymerization) of about 300 (manufactured by Miki & Co., Ltd.).

Example 1

Synthesis of Cellulose n-pentanate 3 (Compound 1-3)(Degree of Substitution: 2.76) and Measurement of Degree of Substitution Thereof To 150 ml of dimethylacetamide, 12.6 g of lithium chloride was added and completely dissolved by stirring at 80° C. for 30 min, then 3.0 g of dimethylacetamide-impregnated cellulose (cellulose content: 56.4% by weight) was added thereto. The mixture was stirred at 50° C. for 30 min, then 7.1 ml of n-valeroyl chloride was added. After the temperature was raised to 80° C. again, the mixture was stirred for 2.5 hours. Stirring was stopped and the mixture was poured into 2 litters of water to reprecipitate cellulose n-pentanate. The resulting solid was filtered and washed 3 times with 100 ml of water and twice with 50 ml of methanol, then dried with vacuum for 6 hours to obtain 3.2 g of cellulose n-pentanate as white powder.

The resulting cellulose n-pentanate was dissolved in a mixed solvents of acetone/DMSO, then hydrolyzed using a 1N sodium hydroxide aqueous solution. At the same time, a solution of the mixed solvents of acetone/DMSO added with the same amount as the above of 1N sodium hydroxide aqueous solution was prepared as a blank. Back titrations for both solutions were carried out with 1N sulfuric acid to determine a degree of substitution (a number of substitution by n-pentanate group per one cellulose monomer unit) of 2.76.

Example 2

Synthesis and Degrees of Substitution of Cellulose n-heptanate-acetate 1 (Compound 3-1)

Using 3.0 g of dimethylacetamide-impregnated cellose (cellulose content: 56.4% by weight) and 3.6 ml of n-heptanoyl chloride, the same procedures were carried out as in Example 1 to synthesize 2.9 g of cellulose n-heptanate. Degree of substitution by n-heptanoyl group was 1.54. After 1.5 g of this cellulose n-heptanate was dissolved in acetone, the same procedure was carried out as in Example 1 using 5.5 ml of acetyl chloride to synthesize 1.4 g of cellulose n-heptanate. Degree of substitution by acetyl group was 0.93.

Example 3

Synthesis and Degree of Substitution of Cellulose n-hexanate 2 (Compound 2-2)

To 2.5 l of dimethylacetamide, 210 g of lithium chloride was added and completely dissolved by stirring at 80° C. for 30 min, then 50.0 g of dimethylacetamide-impregnated cellulose (cellulose content: 55.7% by weight) was added thereto. The mixture was stirred at 50° C. for 90 min, then 79.2 ml of n-hexanoyl chloride was added. After the temperature was raised to 80° C. again, the mixture was stirred for 3 hours. Stirring was stopped and the reaction mixture was poured into 5 litters of water to reprecipitate cellulose n-hexanate. The resulting solid was filtered and washed 3 times with 1 l of 50% methanol solution, then dried with vacuum for 48 hours to obtain 57.2 g of cellulose n-hexanate as white powder.

Similar procedure was carried out as in Example 1 to determine a degree of substitution (the number of substitution by n-hexanate group per one cellulose monomer unit) of 2.43.

Example 4

Synthesis of Cellulose n-octanate 1 (Compound 4-1)

To 2.5 l of dimethylacetamide, 210 g of lithium chloride was added and completely dissolved by stirring at 80° C. for 30 min, then 50.0 g of dimethylacetamide-impregnated cellulose (cellulose content: 55.7% by weight) was added thereto. The mixture was stirred at 50° C. for 90 min, then 114 ml of n-octanoyl chloride was added. After the temperature was raised to 80° C. again, the mixture was stirred for 6 hours. Stirring was stopped and the reaction mixture was poured into 5 litters of water to reprecipitate cellulose n-octanate. The solid was filtered and washed 3 times with 1l of 50% methanol solution, then dried with vacuum for 48 hours to obtain 54.6 g of cellulose n-octanate as white powder.

Similar procedure was carried out as in Example 1 to determine a degree of substitution (a number of substitution by n-octanate group per one cellulose monomer unit) of 2.14.

Example 5

Syntheses and Degrees of Substitution of Various Types of Cellulose Derivatives The similar procedures were carried out as in Examples 1 to 4 to synthesize various types of cellulose derivatives and measure degrees of substitution thereof. Degree of substitution was controlled by adjusting an amount of acid chloride to be added. The cellulose derivatives thus synthesized and degrees of substitution thereof are shown in Table 1 including those synthesized in Examples 1 to 4.

TABLE 1

Cellulose derivatives synthesized and degrees of substitution thereof

| Cellulose derivative | Designation of compound | Degree of substitution |
|---|---|---|
| Cellulose n-pentanate 1 | Compound 1-1 | 2.24 |
| Cellulose n-pentanate 2 | Compound 1-2 | 2.29 |
| Cellulose n-pentanate 3 | Compound 1-3 | 2.76 |
| Cellulose n-pentanate 4 | Compound 1-4 | 2.91 |
| Cellulose n-pentanate 5 | Compound 1-5 | 2.98 |
| Cellulose n-hexanate 1 | Compound 2-1 | 2.14 |
| Cellulose n-hexanate 2 | Compound 2-2 | 2.43 |
| Cellulose n-hexanate 3 | Compound 2-3 | 2.54 |
| Cellulose n-hexanate 4 | Compound 2-4 | 2.74 |
| Cellulose n-heptanate-acetate 1 | Compound 3-1 | 1.54/0.93 |
| Cellulose n-heptanate-acetate 2 | Compound 3-2 | 2.30/0.02 |
| Cellulose n-heptanate-acetate 3 | Compound 3-3 | 2.84/0.08 |
| Cellulose n-octanate 1 | Compound 4-1 | 2.14 |

(Note):
In the above table, degree of substitution of 1.54/0.93 for cellulose n-heptanate-acetate 1 means that a degree of substitution by n-heptanate group is 1.54 and a degree of substitution by acetate group is 0.93. Other similar expressions represent the same meaning.

Example 6

Preparation of a Retardation Film from Cellulose n-pentanate 2

Cellulose n-pentanate 2 synthesized in Example 5 was dissolved in cyclopentanone to prepare a 10% solution by weight of the polymer solution. A releasing paper was pasted on a flat and smooth glass plate so that the surface of paper is not disordered, on which the cellulose n-pentanate solution was casted and dried to prepare a transparent film of cellulose n-pentanate. This film was cut out in rectangles, stretched until reaching 2 times of the original length under the condition of 150° C. while both ends of the film were fixed, then cooled down to room temperature to obtain a retardation film of the present invention (thickness: 77 μm, retardation value at 550 nm: 132 nm). Further, using an automatic birefringence meter (KOBRA-21ADH, made by Oji Scientific Instruments Co., Ltd.), retardation value at each wavelength was measured, and ratio of retardation value at 550 nm (Re550) and retardation value at each wavelength (Ren) (ratio of retardation values: Ren/Re550) was calculated. The thus obtained wavelength dispersion characteristics are shown in FIG. 3. In this case, the slow axis of this retardation film was parallel to the stretching direction.

Example 7

Preparation of a Retardation Film from Cellulose n-hexanate 2

Cellulose n-hexanate 2 synthesized in Example 3 was dissolved in cyclopentanone to prepare a 20% solution by weight of the polymer. A releasing paper was pasted on a flat and smooth glass plate so that the surface of paper is not disordered, on which the cellulose n-hexanate solution was casted and dried to prepare a transparent film. This film was cut out in rectangles, stretched until reaching 1.8 times of the original length under the condition of 120° C. while both ends of the film were fixed, then cooled down to room temperature to obtain a retardation film of the present invention (thickness: 79 μm, retardation value at 550 nm: 129 nm). The wavelength dispersion characteristics of this retardation film obtained by the similar procedure to that in Example 6 are shown in FIG. 4. In this case, the slow axis of this retardation film was parallel to the stretching direction.

Example 8

Preparation of a Retardation Film from Cellulose n-heptanate-acetate 1

Cellulose n-heptanate-acetate 1 (degrees of substitution: 1.54/0.93) (Compound 3-1) synthesized in Example 2 was dissolved in cyclopentanone to prepare a 15% solution by weight of the polymer. A releasing paper was pasted on a flat and smooth glass plate so that the surface of paper is not disordered, on which the cellulose n-heptanate-acetate solution was casted and dried to prepare a transparent film. This film was cut out in rectangles, stretched until reaching 1.6 times of the original length under the condition of 100° C. while both ends of the film were fixed, then cooled down to room temperature to obtain a retardation film of the present invention (thickness: 46 μm, retardation value at 550 nm: 46 nm). The wavelength dispersion characteristics of this retardation film obtained by the similar procedure as in Example 6 are shown in FIG. 5. In this case, the slow axis of this retardation film was parallel to the stretching direction.

Example 9

Preparation of a Retardation Film from Cellulose n-octanate 1

Cellulose n-octanate 1 (Compound 4-1) synthesized in Example 4 was dissolved in cyclopentanone to prepare a 15% solution by weight of the polymer. A releasing paper was pasted on a flat and smooth glass plate so that the surface of paper is not disordered, on which the cellulose n-octanate solution was casted and dried to prepare a transparent film. This film was cut out in rectangles, stretched until reaching 1.6 times of the original length under the condition of 100° C. while both ends of the film were fixed, then cooled down to room temperature to obtain a retardation film of the present invention (thickness: 75 μm, retardation value at 550 nm: 75 nm). The wavelength dispersion characteristics of this retardation film obtained by the similar procedure to that in Example 6 are shown in FIG. 5. In this case, the slow axis of this retardation film was orthogonal to the stretching direction.

Example 10

Preparation of Retardation Films from the Cellulose Derivatives Other than the Cellulose Derivatives Used in the above Examples 6 to 9 and Wavelength Dispersion Characteristics Thereof Using the cellulose derivatives described in the above Table 1 other than the cellulose derivatives used in the above Examples 6 to 9, retardation films were prepared by the similar method to that in Examples 6 to 9 corresponding to the kind of substituent, and ratios of retardation values thereof relative to a wavelength of 550 nm were determined by the similar procedure as in Example 6. The wavelength characteristics of these retardation films are shown in FIGS. 3 to 5.

Example 11

Calculation of the Constants A1 and A2 from the Relation Between Birefringence and Ratio of Retardation Values From the relation between birefringence and ratio of retardation values, the constants A1 and A2 of the following formulae (1) and (2) were calculated (as on an weighted average from constant A for each measuring point), from which it was confirmed that since the same substituent exhibits the equivalent constant, the wavelength characteristics can be controlled by changing degree of substituent. These relations are shown in FIGS. 6 to 11.

$$(Re750/Re550) = A1/\Delta n + 1 \quad (1)$$

$$(Re450/Re550) = A2/\Delta n + 1 \quad (2)$$

[(Re750/Re550) is a ratio of a retardation value at a wavelength of 750 nm to a retardation value at a wavelength of 550 nm, (Re450/Re550) is a ratio of a retardation value at a wavelength of 450 nm to a retardation value at a wavelength of 550 nm, $\Delta n$ is a birefringence of an oriented polymer at a wavelength of 550 nm, A1 and A2 are each a constant].

The values of A1 and A2 in each cellulose derivative obtained are as described below.

| Cellulose delivative | A1 ($\times 10^{-5}$) | A2 ($\times 10^{-5}$) |
| --- | --- | --- |
| Cellulose n-pentanate | 5.02 | −3.64 |
| Cellulose n-hexanate | 6.52 | −4.85 |
| Cellulose n-heptanate-acetate | 7.51 | −4.96 |

Example 12

Preparation of a Quarter Wavelength Retardation Film and a Circularly Polarizing Film A retardation film of the present invention was prepared from the Compound 1-2 (cellulose n-pentanate 2, degree of substitution: 2.29) described in Example 5 by the similar method to that in Example 6. Thickness was 77 μm, retardation value at 550 nm was 132 nm, and also birefringence was 0.00171. Variation of retardation values of this film in the directions tilted from the slow axis direction and the fast axis direction of this retardation film to 50°, respectively, that is, ratios (Rn/Ro) of Rn (a retardation value for 590 nm at an angle n°) to Ro (a retardation value for 590 nm at the front direction (0°)) was calculated by measurement viewing angle characteristics of this film with an automatic birefringence meter (KOBRA-21ADH, made by Oji Scientific Instruments Co., Ltd.). The results are shown in FIG. 12. Subsequently, a circularly polarizing film of the present invention was prepared by laminating a polarizing film having a thickness of 180 μm (SKN18243T, made by Polatechno Co., Ltd.) and the retardation film of the present invention so that an angle of the absorption axis of the polarizing film and the slow axis of the retardation film became 45° using an acrylic pressure-sensitive adhesive. Thickness of the circularly polarizing film was 277 μm. Then, this circularly polarizing film was placed on a mirror to observe an anti-reflection effect on the mirror surface. The circularly polarizing film of the present invention exhibited deep black color showing to have a superior anti-reflection effect.

Example 13

Hydrolysis Treatment of the Quarter Wavelength Retardation Film and Preparation of a Circularly Polarizing Film A retardation film of the present invention was prepared from the Compound 2-2 (cellulose n-hexanate 2, degree of substitution: 2.43) described in Example 5 by the similar method to that in Example 7. Thickness was 85 μm, retardation value at a wavelength of 550 nm was 139 nm, and also birefringence was 0.00164. Then, viewing angle characteristics of this retardation film were evaluated in the similar manner as in Example 12. The results are shown in FIG. 12 and FIG. 13. Subsequently, this retardation film was immersed in a 6N potassium hydroxide aqueous solution at 60° C. for 15 min, followed by sufficient washing with water, then dried at 30° C. for 30 min, to obtain a retardation film of the present invention with a hydrolyzed surface layer. Contact angle of water on the surface of this film was 15°. Further, a circularly polarizing film of the present invention was obtained by laminating the hydrolyzed retardation film of the present invention on the polarizing element surface of a polarizing film having a thickness of 100 μm which had a support film only in one side of the polarizing element (UDN10243T, made by Polatechno Co., Ltd.) and in such an arrangement that an angle of the absorption axis of the polarizing film and the slow axis of said retardation film became 45° using a poly(vinyl alcohol) type adhesive (NH26, made by Nippon Synthetic Chemical Industry Co., Ltd.). Thickness of the resulting circularly polarizing film was 185 μm. Similar evaluation to that in Example 12 was carried out on the film. The circularly polarizing film of the present invention exhibited deep black color showing to have a superior anti-reflection effect.

Example 14

Preparation of an Optical Film

The similar procedures were carried out as in Example 13, except that the hydrolyzed retardation film of the present invention obtained in Example 13 was laminated with a polarizing film in such an arrangement that the absorption axis of the polarizing film and the slow axis of said retardation film were in orthogonal to each other, to obtain an optical film of the present invention.

Example 15

Preparation of an Optical Film

A hydrolyzed retardation film of the present invention was obtained by the similar procedures to those in Example 13 except that Compound 2-2 (cellulose n-hexanate 2, degree of substitution: 2.43) was used and that a retardation value at 550 nm was 50 nm. Then, an optical film of the present invention was obtained by the similar procedures to those in Example 14.

Example 16

Preparation of an Optical Film

A retardation film of the present invention was obtained by the similar procedures to those in Example 9 except that cellulose n-octanate 1 (Compound 4-1) was used, and that a thickness and a retardation value at 550 nm were 140 μm and 140 nm, respectively. The slow axis of this retardation film was orthogonal to the stretching direction. Subsequently, this film was subjected to hydrolysis treatment by the similar procedures to those in Example 13. Then, the similar procedures to those in Example 14 were carried out except that this retardation film was laminated with a polarizing film in such an arrangement that the absorption axis of the polarizing film and the stretching direction of said retardation film were in parallel, to obtain an optical film of the present invention.

Example 17

Preparation of a Composite Optical Film

A composite optical film of the present invention was obtained by laminating the optical film of the present invention obtained in Example 14 with a retardation film having a retardation value in the front direction of film at 550 nm of about 0 nm, a thickness of 50 μm, (no−ne) of 0.0024 and Rth of about 120 nm, using an acrylic pressure-sensitive adhesive.

Example 18

Preparation of a Composite Optical Film

A composite optical film of the present invention was obtained by carrying out the similar procedures to those in Example 17 except that the optical film of Example 15 was used.

Example 19

Preparation of a Composite Optical Film

A composite optical film of the present invention was obtained by carrying out the similar procedures to those in Example 17 except that the optical film of Example 16 was used.

Example 20

Preparation of a Liquid Crystal Display Device and Evaluation of its Viewing Angle Characteristics A polarizing film was removed from a VA type liquid crystal display device commercially produced, and a polarizing film (SKN18243T, made by Polatechno Co., Ltd.) in which a polarizing element is sandwiched by two triacetylcellulose films in the backlight side and the composite optical film prepared in Example 17 in the observation surface side were laminated to the liquid crystal cell using an acrylic pressure-sensitive adhesive so that the absorption axes of both polarizing films were in orthogonal to each other, to obtain a liquid crystal display device of the present invention. With the backlight of this liquid crystal display device being lighted, an image in the black-displaying state was observed from the direction tilted from the front direction of the display screen in a 45° plane from the absorption axis of the polarizing film. It was found that the black state was maintained even in the direction tilted by 85° proving the viewing angle being widened.

Example 21

Preparation of a Liquid Crystal Display Device and Evaluation of Viewing Angle Characteristics Thereof A liquid crystal display device of the present invention was obtained by the similar procedures to those in Example 20 except that the composite optical film of Example 18 was used. This liquid crystal display device was evaluated in the similar manner to that in Example 20, and it was found that light passed through in the direction tilted by 85° and failed to maintain the black state, though black state was maintained up to around 70°.

Example 22

Preparation of a Liquid Crystal Display Device and Evaluation of Viewing Angle Characteristics Thereof A liquid crystal display device of the present invention was obtained by the similar procedures as in Example 20 except that the composite optical film of Example 19 was used. This liquid crystal display device was evaluated in the similar manner to that in Example 20. It was found that the black state was maintained even in the direction tilted by 85° proving the viewing angle being widened.

Example 23

A mixed liquid of 50 g of palmitic acid and 8.35 ml of trifluoroacetic anhydride was heated to 55° C., and stirred for 20 min. Then, 1.32 g of cellulose represented by the formula (1) having a number of unit (degree of polymerization) of about 300 (made by Miki & Co., Ltd.) was added to said mixed liquid maintained at 55° C., and the mixture was stirred for 5 hours. Subsequently, this mixture was added to 1,000 ml of methanol to separate out precipitate. The precipitate was collected by suction filtration, and the precipitate on the filtration paper was sufficiently washed with ethyl acetate, and vacuum-dried at 40° C., to obtain 5.84 g of cellulose n-palmitate as white powder.

Subsequently, the cellulose n-palmitate was dissolved in a mixed solvents of acetone/DMSO, then hydrolyzed using a 1N sodium hydroxide aqueous solution. At the same time, a solution of the mixed solvents of acetone/DMSO added with the same amount of 1N sodium hydroxide aqueous solution was stirred as a blank. Back titrations for both solutions were carried out with 1N sulfuric acid to determine a degree of substitution (a number of substitution by n-palmitate group per one cellulose monomer unit) of 2.9.

The resulting cellulose n-palmitate was dissolved in chloroform to prepare a 5% by weight of solution. Then, a releasing paper (PET3811, made by Lintec Corp.) was pasted on the flat and smooth glass plate with surface of the opposite side to the releasing face using a pressure-sensitive adhesive. On the releasing face, the cellulose n-palmitate solution was casted and dried at room temperature, to prepare a unstretched cellulose n-palmitate film. This film was cut out in rectangles, and both ends of the short side were fixed, one of which was uniaxially stretched in the longitudinal direction until reaching 1.5 times of the original length at 60° C. to obtain a retardation film. Thickness of this retardation film was about 80 μm. Then, using an automatic birefringence meter (KOBRA-21ADH, made by Oji Scientific Instruments Co., Ltd.), retardation value at 590 nm was measured, and found to be 120 nm. In addition, refractive index of the retardation film of the present invention obtained was measured using an Abbe refractometer (Abbe refractometer 1T, made by Atago Co., Ltd.), and it was found that a refractive index in the stretching direction nx=1.4900, a refractive index in the direction orthogonal to the stretching direction in the film plane ny=1.4915, and a refractive index in the thickness direction nz=1.4925.

Example 24

By the similar method to that in Example 23 except that 14.3 g of lauric acid was used instead of palmitic acid, 8.96 g of cellulose n-laurate was obtained. Subsequently, degree of substitution was measured by the similar procedures to those in Example 1, and found to be 2.9. Using this cellulose n-laurate, a unstretched film of cellulose n-laurate was prepared by the similar procedures to those in Example 23. Then, a retardation film of the present invention was obtained by the similar procedures to those in Example 23 except that the film was uniaxially stretched at 80° C. until reaching 1.5 times of the original length. Thickness of this retardation film was 130 μm. Retardation value of the thus obtained retardation film was measured similarly as in Example 23 and found to be 250 nm at 590 nm. Further, regarding refractive indices of the thus obtained retardation film, it was also found that a refractive index in the stretching direction nx=1.4790, a refractive index in the direction orthogonal to the stretching direction in the film plane ny=1.4810, and a refractive index in the thickness direction nz=1.4818. Viewing angle characteristics of this retardation film were evaluated similarly as in Examples 12 and 13. The results are shown in FIG. 13.

Subsequently, an achromatic wide viewing angle retardation film of the present invention was obtained by laminating this retardation film and a uniaxially stretched polycarbonate film having a retardation value of 120 nm so that the fast axis (stretching direction) of the retardation film and the slow axis (stretching direction) of the polycarbonate film were in parallel using a pressure-sensitive adhesive. This retardation film was laminated with a polarizing film (SKN18243T, made by Polatechno Co., Ltd.) in which a polarizing element consisted of poly(vinyl alcohol) with adsorbed and oriented iodine was sandwiched by triacetylcellulose films from both sides so that an angle of the slow axis of the retardation film and the absorption axis of the polarizing film was 45° using an acrylic pressure-sensitive adhesive, to obtain an achromatic wide viewing angle circularly polarizing film which was one embodiment of the present invention. Anti-reflection effect of this circularly polarizing film was evaluated by arranging this film on a glass plate so that the polarizing film was placed in the foreground, and it was confirmed that reflection in the front direction showed deep black and anti-reflection effect was obtained in the achromatic visible light region. Further, the state of reflection was evaluated in the directions tilted toward upper and lower sides and right and left sides from the front direction by about 50° each, and it was found that reflection maintained black color and anti-reflection effect was obtained achromatically and also in a wide viewing angle.

Further, a wide viewing viewing angle polarizing film which was one embodiment of the optical film of the present invention was obtained by laminating the retarding film of the present invention obtained by stretching the above cellulose n-laurate film and a polarizing film (SKN18243T, made by Polatechno Co., Ltd.) using an acrylic pressure-sensitive adhesive so that the fast axis of the retarding film and the absorption axis of the polarizing film were in parallel. Then, this wide viewing angle polarizing film of the present invention was laminated with another polarizing film (SKN18243T, made by Polatechno Co., Ltd.) so that the absorption axis of the wide viewing angle polarizing film and the absorption axis of the another polarizing film were orthogonal to each other (cross-Nicol) and the retardation film of the present invention was placed in between two polarizing films. This laminated film was placed on a surface light source as it is, and degree of passing through light was evaluated in the direction tilted from the front direction by about 50° and in the direction of 45° from each absorbing axis. As a result, in the case of the wide viewing angle polarizing film of the present invention, it was found that passing through of light was hardly observed proving the light being cut off in wide viewing angle.

Example 25

By the similar method to that in Example 23 except that 49.9 g of n-decanoic acid instead of palmitic acid, 33.8 ml of trifluoroacetic anhydride and 1.32 g of cellulose represented by the formula (1) having a number of unit (a degree of polymerization) of about 300 (made by Miki & Co., Ltd.) were used, 3.77 g of cellulose n-decanate was obtained. Subsequently, degree of substitution was measured by the similar procedures th the procedures in Example 23, and found to be 2.9. Using this cellulose n-decanate, a unstretched film of cellulose n-decanate was prepared by the similar procedures to those in Example 23. Then, a retardation film of the present invention was obtained by the similar procedures to those in Example 23 except that the film was uniaxially stretched at 50° C. until reaching 2.0 times of the original length. Thickness of this retardation film was about 95 μm. Retardation value of the thus obtained retardation film was measured similarly as in Example 23, and found to be 267 nm at 590 nm. Further, regarding to refractive indices of the thus obtained retardation film, it was also found that a refractive index in the stretching direction nx=1.4712, a refractive index in the direction orthogonal to the stretching direction in the film plane ny=1.4740, and a refractive index in the thickness direction nz=1.4760. Characteristics angle of view of this retardation film were evaluated similarly as in Examples 12 and 13. The results are shown in FIG. 13.

Example 26

By the similar method to that in Example 23 except that 48 ml of n-octanoic acid instead of palmitic acid, 35.4 ml of trifluoroacetic anhydride and 1.38 g of cellulose represented by the formula (1) having a number of unit (a degree of polymerization) of about 300 (made by Miki & Co., Ltd.) were used, 3.16 g of cellulose n-octanate was obtained. Subsequently, degree of substitution was measured by the similar procedures to those in Example 23, and found to be 2.9. Using this cellulose n-octanate, a unstretched film of cellulose n-octanate was prepared by the similar procedures to those in Example 23. Then, a retardation film of the present invention was obtained by the similar procedures to those in Example 23 except that the film was uniaxially stretched at 60° C. until reaching 2.0 times of the original length. Thickness of this retardation film was about 95 μm. Retardation value of the thus obtained retardation film was measured similarly as in Example 23, and found to be 370 nm at 590 nm. Further, regarding refractive indices of the thus obtained retardation film, it was also found that a refractive index in the stretching direction nx=1.4720, a refractive index in the direction orthogonal to the stretching direction in the film plane ny=1.4759, and a refractive index in the thickness direction nz=1.4730. Viewing angle characteristics of this retardation film were evaluated similarly as in Examples 12 and 13. The results are shown in FIG. 13.

Example 27

Using cellulose n-octanate prepared in Example 26, a retardation film of the present invention was obtained by the similar procedures to those in Example 26 except that stretching temperature was 55° C., stretching ratio was 3.0 times and thickness of the retardation film obtained was 77 μm. Retardation value of the thus obtained retardation film was measured similarly as in Example 23, and found to be 452 nm at 590 nm. Characteristics of angle of view of this retardation film were evaluated similarly as in Examples 12 and 13. The results are shown in FIG. 13.

Example 28

By the similar method to that in Example 23 except that 48 ml of n-heptanoic acid instead of palmitic acid, 39.6 ml of trifluoroacetic anhydride and 1.55 g of cellulose represented by the formula (1) having a number of unit (a degree of polymerization) of about 300 (made by Miki & Co., Ltd.) were used, 3.86 g of cellulose n-heptanate was obtained. Subsequently, degree of substitution was measured by the similar procedures to those in Example 23, and found to be 2.9. Using this cellulose n-heptanate, a unstretched film of cellulose n-heptanate was prepared by the similar procedures to those in Example 23. Then, a retardation film of the present invention was obtained by the similar procedures to those in Example 23 except that the film was uniaxially stretched at 80° C. until reaching 2.0 times of the original length. Thickness of this retardation film was about 95 μm. Retardation value of the thus obtained retardation film was measured similarly as in Example 23, and found to be 266 nm at 590 nm. Further, regarding to refractive indices of the thus obtained retardation film, it was also found that a refractive index in the stretching direction nx=1.4732, a refractive index in the direction orthogonal to the stretching direction in the film plane ny=1.4760, and a refractive index in the thickness direction nz=1.4750. Viewing angle Characteristics of this retardation film were evaluated similarly as in Examples 12 and 13. The results are shown in FIG. 13.

Comparative Example 1

Evaluation of a Quarter Wavelength Retardation Film Made of Polycarbonate

A circularly polarizing film was prepared by the similar method to that in Example 12 except that a quarter wavelength retardation film made of polycarbonate (retardation value at 550 nm was 141 nm) was used, and its anti-reflection effect was observed. The film showed dark purple color proving that the anti-reflection effect was insufficient.

Comparative Example 2

A retardation film made of cellulose acetate having a degree of substitution of 2.5, which contained diethyl phthalate as a plasticizer and had a thickness of 200 μm, was evaluated similarly as in Example 6, and it was found that retardation value at 550 nm was 144 nm and birefringence was 0.00072. Wavelength dispersion characteristics of this retardation film are shown in FIG. 14. Further, viewing angle characteristics of this retardation film were evaluated similarly as in Examples 12 and 13. The results are shown in FIG. 12. The ratio of retardation values (Rn/Ro) at the tilted angle of 50° significantly differs from 1 indicating that viewing angle characteristics were insufficient.

Comparative Example 3

Evaluation of characteristic of angle of view in a liquid crystal display device was prepared by the similar procedures to those in Example 20 except that the polarizing film (SKN18243T, made by Polatechno Co., Ltd.), in which a polarizing element was sandwiched by two triacetylcellulose films, was used also in the observation surface side too. This liquid crystal display device was evaluated similarly as in Example 20, and it was found that light passed through drastically from the direction tilted by about 40° and the black state could not be maintained.

Comparative Example 4

A triacetylcellulose film (TD80UF, thickness: 80 μm, made by Fuji Photo Film Co., Ltd.) was uniaxially stretched until reaching 1.8 times of the original length at 210° C. by the similar method to that in Example 23. The resulting retardation film had a thickness of 77 μm, and measurement of retardation value by the similar procedures to those in Example 23 gave a retardation value of 77 nm at 590 nm. Further, regarding to refractive indices of the thus obtained retardation film, it was also found that a refractive index in the stretching direction nx=1.4875, a refractive index in the direction orthogonal to the stretching direction in the film plane ny=1.4885, and a refractive index in the thickness direction nz=1.4874. In addition, after this triacetylcellulose film was purified to remove a plasticizer and a UV absorbing agent, degree of substitution was measured by the similar procedures as in Example 23 to obtain a degree of substitution of 2.9.

Comparative Example 5

A laminated film was prepared by the similar procedures to those in Example 24 except that two polarizing films (SKN18243T, made by Polatechno Co., Ltd.) were used instead of the wide viewing angle polarizing film which was one embodiment of the optical film of the present invention in Example 24, so that the absorption axes of both films were in orthogonal to each other. Except for using the resulting film, degree of passing through of light was evaluated by the similar procedures to those in Example 24. It was found that light passed through in almost all direction and the light blocking effect was dramatically reduced.

In the retardation films of the present invention obtained from the cellulose derivatives of the present invention synthesized in Examples 1 to 5, as shown in Examples 6 to 11, it is understood that wavelength dispersion characteristics and positiveness or negativeness in birefringence can be optionally controlled by changing type of substituent and degree of substitution. Further, from the results of Examples 12 and 13 and Comparative Example 1, the circularly polarizing film prepared using the retardation film having achromatic wavelength dispersion characteristics of the present invention is found to have a superior anti-reflection effect compared with the polarizing film in Comparative Example 1. Further, from the results of Examples 12 and 13 and Comparative Example 2, when comparison is made with a quarter wavelength retardation film of each polarizing film, it is found that the retardation film of the present invention can reduce its thickness due to a larger birefringence compared with that of the retardation film of Comparative Example 2. Further, when a retardation film is tilted, the retardation film of the present invention shows less change in retardation value proving that the retardation film of the present invention has superior viewing angle characteristics. Further, as shown in Examples 14 to 19, an optical film or a composite optical film of the present invention can be obtained by using a retardation film of the present invention and a polarizing film. Further, it is found that the liquid crystal display device of the present invention having a composite optical film of the present invention has a more widened angle of view compared with that of Comparative Example 3. Further, in the comparison of Examples 20 and 22 and Example 21, those in Examples 20 and 22 are more superior in widening effect of view, and the retardation values at 550 nm of the retardation films of the present invention are found to be in more preferable range. On the other hand, as apparent from a comparison of Examples 23 to 28 and Comparative Example 4, it is found that the retardation film of the present invention has a biaxial property regardless of uniaxially stretched film, because the film satisfies the relation: nz>ny>nx or ny>nz>nx. Further, as shown in Example 24, the achromatic wide viewing angle circularly polarizing film of the present invention using an achromatic wide viewing angle retardation film prepared with a retardation film of the present invention is found to be superior in anti-reflection effect, and also to be able to maintain the effect even when tilted. Further, the wide viewing angle polarizing film, which is one embodiment of an optical film of the present invention, is found to have improved viewing angle characteristics as a polarizing film compared with that of Comparative Example 5, from the results that when the wide viewing angle polarizing film is arranged so that the absorption axes of the wide viewing angle polarizing film and the other polarizing film are in orthogonal to each other (cross-Nicol), light passing through the polarizing film is reduced even in a tilted direction from the front direction toward a different direction from each absorption axis. Still further, the retardation films of the present invention having a biaxial property obtained in Examples 25 to 28 are found to have particularly superior viewing angle characteristics as a retardation film, because they show further less changes in retardation value when tilted compared with that in Example 13.

The invention claimed is:

1. A retardation film comprising any one of a stretched film having an achromatic property formed from cellulose n-pentanate having a degree of substitution for hydroxyl group per one cellulose monomer unit of 2.0 to 2.8, cellulose n-hexanate having a degree of substitution for hydroxyl group per one cellulose monomer unit of 2.0 to 2.6 or cellulose n-heptanate having a degree of substitution for hydroxyl group per one cellulose monomer unit of 1.0 to 2.99, or a stretched film having a biaxial property prepared by uniaxially stretching cellulose n-heptanate having a degree of substitution for hydroxyl group per one cellulose monomer unit of 2.5 to 2.99 or a cellulose derivative substituted by a straight chained ($C_8$-$C_{20}$) acyl group in a degree of substitution for hydroxyl group per one cellulose monomer unit of 1.00 to 2.99, wherein said retardation film satisfies the relations represented by the following formulae (1) and 2):

$$(Re750/Re550)=A1/\Delta n+1 \quad (1)$$

$$(Re450/Re550)=A2/\Delta n+1 \quad (2)$$

wherein, (Re750/Re550) is a ratio of a retardation value at a wavelength of 750 nm to a retardation value at a wavelength of 550 nm, showing a value of 0.05 to 1.95; (Re450/Re550) is a ratio of a retardation value at a wavelength of 450 nm to a retardation value at a wavelength of 550 nm, showing a value of 0.05 to 1.95; $\Delta n$ is a birefringence of the retardation film at a wavelength of 550 nm, showing a value of 0.0001 to 0.06; A1 and A2 are each a constant showing a value of –0.06 to 0.06, and when A1 is a positive value, A2 becomes a negative value, and when A1 is a negative value, A2 becomes a positive value.

2. The retardation film according to claim 1, wherein said stretched film is prepared by uniaxially stretching cellulose n-heptanate having a degree of substitution for hydroxyl group per one cellulose monomer unit of 2.5 to 2.99 or any one of a cellulose derivative having a degree of substitution of hydroxyl group per one cellulose monomer unit of 1.00 to 2.99 selected from the group consisting of cellulose n-octanate, cellulose n-nonanate, cellulose n-decanate, cellulose n-undecanate, cellulose n-dodecanate, cellulose n-tridecanate, cellulose n-tetradecanate, cellulose n-pentadecanate, cellulose n-hexadecanate, cellulose n-heptadecanate, cellulose n-octadecanate, cellulose n-nanodecanate and cellulose n-eicosanate.

3. A retardation film having a biaxial property prepared by uniaxially stretching a cellulose derivative containing a straight chained aliphatic acyl group having 5 to 20 carbon atoms and a substituent different from said aliphatic substituent, wherein a degree of substitution by said straight chained aliphatic acyl group having 5 to 20 carbon atoms is not less than 1.00 and a degree of substitution by total substituents including the substituent different from said aliphatic substituent is 1.5 to 2.99 substitutions per one cellulose monomer unit, wherein said retardation film satisfies the relations represented by the following formulae (1) and (2):

$$(Re750/Re550)=A1/\Delta n+1 \quad (1)$$

$$(Re450/Re550)=A2/\Delta n+1 \quad (2)$$

wherein, (Re750/Re550) is a ratio of a retardation value at a wavelength of 750 nm to a retardation value at a wavelength of 550 nm, showing a value of 0.05 to 1.95; (Re450/Re550) is a ratio of a retardation value at a wavelength of 450 nm to a retardation value at a wavelength of 550 nm, showing a value of 0.05 to 1.95; $\Delta n$ is a birefringence of the retardation film at a wavelength of 550 nm, showing a value of 0.0001 to 0.06; A1 and A2 are each a constant showing a value of –0.06 to 0.06, and when A1 is a positive value, A2 becomes a negative value, and when A1 is a negative value, A2 becomes a positive value.

4. A composite retardation film prepared by laminating the retardation film according to any one of claims 1, 2 or 3 and another retardation film.

5. A circularly or an elliptically polarizing film or a rotary polarizing film prepared by laminating the retardation film or the composite retardation film according to any one of claims 1, 2 or 3 and a polarizing film.

6. An optical film prepared by laminating the retardation film according to any one of claims 1, 2 or 3 and a polarizing film so that the slow axis of said retardation film and the absorption axis or the penetration axis of said polarizing film are in parallel or in orthogonal to each other.

7. A composite optical film prepared by laminating a film having Rth calculated by Rth=(no−ne)×d [wherein, ne is an average refractive index in the film plane; no is a refractive index in the thickness direction; (ne−no)<0; d is a thickness] of 100 to 300 nm and a retardation value in the front direction of the film at 550 nm is 0 to 50 nm, the retardation film according to any one of claims 1, 2 or 3 and a polarizing film so that the slow axis of said retardation film and the absorption axis or the penetration axis of said polarizing film are in parallel or in orthogonal to each other.

8. The circularly or the elliptically polarizing film, the rotary polarizing film prepared by laminating the retardation film according to any one of claims 1, 2 or 3 and a polarizing film wherein a polarizing element constructing the polarizing film and said retardation film are directly laminated.

9. An image display device equipped with (1) the retardation film according to any one of claims 1, 2 or 3, or (2) the circularly or the elliptically polarizing film or the rotary polarizing film prepared by laminating the retardation film according to any one of claims 1, 2 or 3 and a polarizing film, or (3) an optical film prepared by laminating the retardation film according to any one of claims 1, 2 or 3 and a polarizing film so that the slow axis of said retardation film and the absorption axis of the penetration axis of said polarizing film are in parallel or orthogonal to each other, or (4) the composite optical film prepared by laminating a film having Rth calculated by Rth−(no−ne)×d (wherein, ne is an average refractive index in the film plane; no is a refractive index in the thickness direction; (ne−no)<0; d is a thickness) of 100 to 300 nm and a retardation value in the front direction of the film at 550 nm is 0 to 50 nm, said retardation film and a polarizing film so that the slow axis of said retardation film and the absorption axis or the penetration axis of said polarizing film are in parallel or orthogonal to each other.

10. The image display device according to claim 9, wherein the image display device is a liquid crystal image display device.

11. An optical film prepared by laminating the retardation film according to any one of claims 1, 2 or 3 and a polarizing film so that the slow axis of said retardation film and the absorption axis or the penetration axis of said polarizing film are in parallel or orthogonal to each other, wherein a polarizing element constructing the polarizing film and said retardation film are directly laminated.

12. A composite optical film prepared by laminating a film having Rth calculated by Rth−(no−ne)×d (wherein, ne is an average refractive index in the film plane; no is a refractive index in the thickness direction; (ne−no)<0; d is a thickness) of 100 to 300 nm and a retardation value in the front direction of the film at 550 nm is 0 to 50 nm, the retardation film according to any one of claims 1, 2 or 3 and a polarizing film so that the slow axis of said retardation film and the absorption axis or the penetration axis of said polarizing film are in parallel or orthogonal to each other, wherein a polarizing element constructing the polarizing film and said retardation film are directly laminated.

13. The circularly or the elliptically polarizing film, or the rotary polarizing film prepared by laminating a composite retardation film prepared by laminating the retardation film according to any one of claims 1, 2 or 3 and another retardation film, and a polarizing film, wherein a polarizing element constructing the polarizing film and said composite retardation film are directly laminated.

* * * * *